(12) United States Patent
Ryoo et al.

(10) Patent No.: US 12,092,747 B2
(45) Date of Patent: Sep. 17, 2024

(54) APPARATUS AND METHOD FOR GENERATING GNSS SIGNAL

(71) Applicants: IDCITI.COM, Incheon (KR); Replex. Co., LTD., Seoul (KR)

(72) Inventors: Jihoon Ryoo, Incheon (KR); Hoyoung Kim, Incheon (KR); Dong Gi Youn, Seoul (KR); Young-Kyung Jeong, Namyangju-si (KR); Kyung Young Heo, Paju-si (KR)

(73) Assignees: IDCITI.COM, Seoul (KR); Replex. Co., LTD., Seoul (KR)

( * ) Notice: Subject to any disclaimer, the term of this patent is extended or adjusted under 35 U.S.C. 154(b) by 0 days.

(21) Appl. No.: 17/450,213

(22) Filed: Oct. 7, 2021

(65) Prior Publication Data

US 2022/0120917 A1    Apr. 21, 2022

(30) Foreign Application Priority Data

Oct. 21, 2020  (KR) .......................... 10-2020-0137081

(51) Int. Cl.
*G01S 19/42*     (2010.01)
(52) U.S. Cl.
CPC .................................. *G01S 19/421* (2013.01)
(58) Field of Classification Search
CPC ....... G01S 19/421; G01S 19/11; G01S 19/215
See application file for complete search history.

(56) References Cited

U.S. PATENT DOCUMENTS

| 10,690,775 | B2 * | 6/2020 | Jokinen | ................. | G01S 19/072 |
| 2007/0063893 | A1 * | 3/2007 | Horton | .................... | G01S 19/11 |
| | | | | | 342/357.55 |

(Continued)

FOREIGN PATENT DOCUMENTS

| CN | 108834073 A | * | 11/2018 | | |
| CN | 110418278 A | * | 11/2019 | ............. | G06N 3/061 |

(Continued)

OTHER PUBLICATIONS

17450968_2022-11-28_CN_108834073_A_M.pdf, machine translation of CN_108834073_A (Year: 2018).*

(Continued)

*Primary Examiner* — Timothy A Brainard
*Assistant Examiner* — Kenneth W Good
(74) *Attorney, Agent, or Firm* — Knobbe, Martens, Olson & Bear, LLP

(57) ABSTRACT

This application relates to an apparatus for generating a global navigation satellite system (GNSS) signal. In one aspect, the apparatus includes a receiver configured to receive and store GNSS navigation information, receive a real-time satellite signal, and calculate a frequency shift value of the real-time satellite signal with respect to a default carrier frequency based on the real-time satellite signal. The apparatus may also include at least one signal generator configured to receive the GNSS navigation information from the receiver, and generate pseudo GNSS signal information corresponding to a current time and a current location based on the GNSS navigation information and the frequency shift value. The apparatus may further include a transmitter configured to generate a pseudo GNSS signal based on the pseudo GNSS signal information, and amplify and output the pseudo GNSS signal, wherein the GNSS navigation information indicates an estimated location of a GNSS satellite over time.

12 Claims, 13 Drawing Sheets

(56) References Cited

U.S. PATENT DOCUMENTS

| | | | | |
|---|---|---|---|---|
| 2010/0079339 A1* | 4/2010 | Yoon | .................. | G01S 19/24 |
| | | | | 342/357.68 |
| 2016/0238713 A1* | 8/2016 | Yoshioka | ................ | G01S 19/22 |
| 2017/0234979 A1* | 8/2017 | Mathews | ................ | G01S 1/024 |
| | | | | 342/357.64 |
| 2017/0285171 A1* | 10/2017 | Ries | ..................... | H04K 1/00 |
| 2019/0041526 A1* | 2/2019 | Lucky | ..................... | G01S 19/27 |
| 2020/0287775 A1* | 9/2020 | Khasis | ................. | H04W 4/185 |
| 2022/0066049 A1* | 3/2022 | Krefft | .................... | G01S 19/37 |

FOREIGN PATENT DOCUMENTS

| | | | | | |
|---|---|---|---|---|---|
| CN | 111308503 A | * | 6/2020 | ............ | G01S 19/07 |
| KR | 10-2008-0045700 A | | 5/2008 | | |
| KR | 10-2013-0074371 A | | 7/2013 | | |
| KR | 10-2014-0023564 A | | 2/2014 | | |
| WO | WO-2015146192 A1 | * | 10/2015 | ............ | G01S 19/05 |

OTHER PUBLICATIONS

17450968_2022-11-28_CN_111308503_A_M.pdf, machine translation of CN_111308503_A (Year: 2020).*

17450968_2022-11-28_CN_110418278_A_M.pdf, machine translation of CN_110418278_A (Year: 2019).*

17450968_2022-11-28_WO_2015146192_A1_M.pdf, machine translation of WO_2015146192_A1 (Year: 2015).*

Office Action in Korean Application No. 10-2020-0137081 dated Dec. 15, 2021 in 14 pages.

Office Action in corresponding Korean Application No. 2022-0189791 dated Feb. 1, 2023.

Office Action dated Aug. 9, 2023 in Korean Application No. 10-2022-0189791 (divisional of priority application KR 10-2020-0137081).

Zhao et al., "Optimized FFT Algorithm and its Application to Fast GPS Signal Acquisition," Fourier Transforms—Approach to Scientific Principles, Prof. Goran Nikolic (Ed.) pp. 157-174, (Apr. 2011) 10.5772/15929.

* cited by examiner

APPARATUS AND METHOD FOR GENERATING GNSS SIGNAL

CROSS-REFERENCE TO RELATED APPLICATION

This application is based on and claims priority under 35 U.S.C. § 119 to Korean Patent Application No. 10-2020-0137081, filed on Oct. 21, 2020, in the Korean Intellectual Property Office, the disclosure of which is incorporated by reference herein in its entirety.

BACKGROUND

1. Field

One or more embodiments relate to an apparatus for generating a global navigation satellite system (GNSS) signal and a method of generating a GNSS signal.

2. Description of the Related Art

A global navigation satellite system (GNSS) is a system for calculating location information of a receiver based on information received from a satellite. Examples of a GNSS include the United states' global positioning system (GPS), Russia's global navigation satellite system (GLONASS), European Union's Galileo, China's BeiDou, Japan's quasi-zenith satellite system (QZSS), and Indian regional navigation satellite system (IRNSS).

SUMMARY

One or more embodiments include an apparatus and method of providing a global navigation satellite system (GNSS) signal in a space (e.g., in an indoor environment or an underground facility) where a GNSS signal may not be received because line of sight (LOS) communication with an artificial satellite is impossible due to an obstacle such as a roof.

Also, one or more embodiments include an apparatus and method of providing a GNSS signal in an indoor environment by using a general-purpose GNSS module, without changing a configuration of a receiving end of a client device.

Also, one or more embodiments include an apparatus and method in which, because a Doppler shift of an actual satellite signal is reflected when a pseudo GNSS signal is provided, during conversion from an actual GNSS signal to a pseudo GNSS signal or from a pseudo GNSS signal to an actual GNSS signal, a client device may receive a GNSS signal without interruption.

Additional aspects will be set forth in part in the description which follows and, in part, will be apparent from the description, or may be learned by practice of the presented embodiments.

According to one or more embodiments, an apparatus for generating a global navigation satellite system (GNSS) signal includes a receiver configured to receive GNSS navigation information, store the GNSS navigation information, receive a real-time satellite signal, and calculate a frequency shift value of the real-time satellite signal with respect to a default carrier frequency based on the real-time satellite signal, at least one signal generator configured to receive the GNSS navigation information from the receiver, and generate pseudo GNSS signal information corresponding to a current time and a current location based on the GNSS navigation information and the frequency shift value, and a transmitter configured to generate a pseudo GNSS signal based on the pseudo GNSS signal information, and amplify and output the pseudo GNSS signal, wherein the GNSS navigation information is information indicating an estimated location of a GNSS satellite over time.

The receiver may be further configured to calculate the frequency shift value and a coarse/acquisition (C/A) code phase value, by cross-correlating the real-time satellite signal with a local signal generated by reflecting the pseudo GNSS signal information.

The signal generator may be further configured to generate the pseudo GNSS signal by applying the C/A code phase value received from the receiver.

The signal generator may be further configured to generate IQ phase data generated by reflecting the pseudo GNSS signal information in a carrier wave corresponding to a frequency calculated by reflecting the frequency shift value, and output the IQ phase data to the transmitter, and the transmitter may be further configured to modulate and radiate a carrier signal of a GNSS L1 frequency band by using the IQ phase data.

The transmitter may include a signal amplifier for amplifying a output signal generated by reflecting the IQ phase data, the transmitter being further configured to adjust an arrival range of the output signal by adjusting an amplification factor of the signal amplifier.

The receiver may be further configured to receive the GNSS navigation information in a first period from a server that provides information about a future estimated location of the GNSS satellite during a certain period of time.

The receiver may include a first communicator configured to communicate with at least one server and the at least one GNSS signal generator, a memory, and a first processor configured to receive the GNSS navigation information for each of a plurality of GNSS satellites from the at least one server through the first communicator, store the received GNSS navigation information in the memory, and transmit the GNSS navigation information stored in the memory to the at least one signal generator through the first communicator.

The at least one signal generator may include a second communicator configured to communicate with the receiver and the transmitter, a memory configured to store the GNSS navigation information, and a second processor configured to generate the pseudo GNSS signal information based on the frequency shift value and the GNSS navigation information, and output the pseudo GNSS signal information to the transmitter through the second communicator.

The transmitter may include an analog signal generator configured to generate an analog signal corresponding to the pseudo GNSS signal, by modulating a carrier signal of a frequency band of a GNSS by using IQ phase data corresponding to the pseudo GNSS signal information, a signal amplifier configured to amplify the analog signal generated by the at least one signal generator, and an antenna configured to output the amplified analog signal.

The GNSS navigation information may include at least one of pseudo-random noise (PRN) information of a GNSS signal receivable by the receiver, a code frequency, a carrier frequency, a carrier phase, a code phase, a plurality of subframes, a navigation message according to time, a pseudorange in which Ionospheric delay is reflected, a pseudorange rate, an azimuth, and an altitude, or a combination thereof.

The GNSS navigation information may be receiver independent exchange format (RINEX) information.

According to one or more embodiments, a method of generating a global navigation satellite system (GNSS) signal includes receiving GNSS navigation information, storing the GNSS navigation information, receiving a real-time satellite signal, calculating a frequency shift value of the real-time satellite signal with respect to a default carrier frequency based on the real-time satellite signal, generating pseudo GNSS signal information corresponding to a current time and a current location based on the GNSS navigation information, generating a pseudo GNSS signal based on the pseudo GNSS signal information, and amplifying and outputting the pseudo GNSS signal, wherein the GNSS navigation information is information indicating an estimated location of a GNSS satellite over time.

BRIEF DESCRIPTION OF THE DRAWINGS

The above and other aspects, features, and advantages of certain embodiments will be more apparent from the following description taken in conjunction with the accompanying drawings.

DETAILED DESCRIPTION

Figure 1:
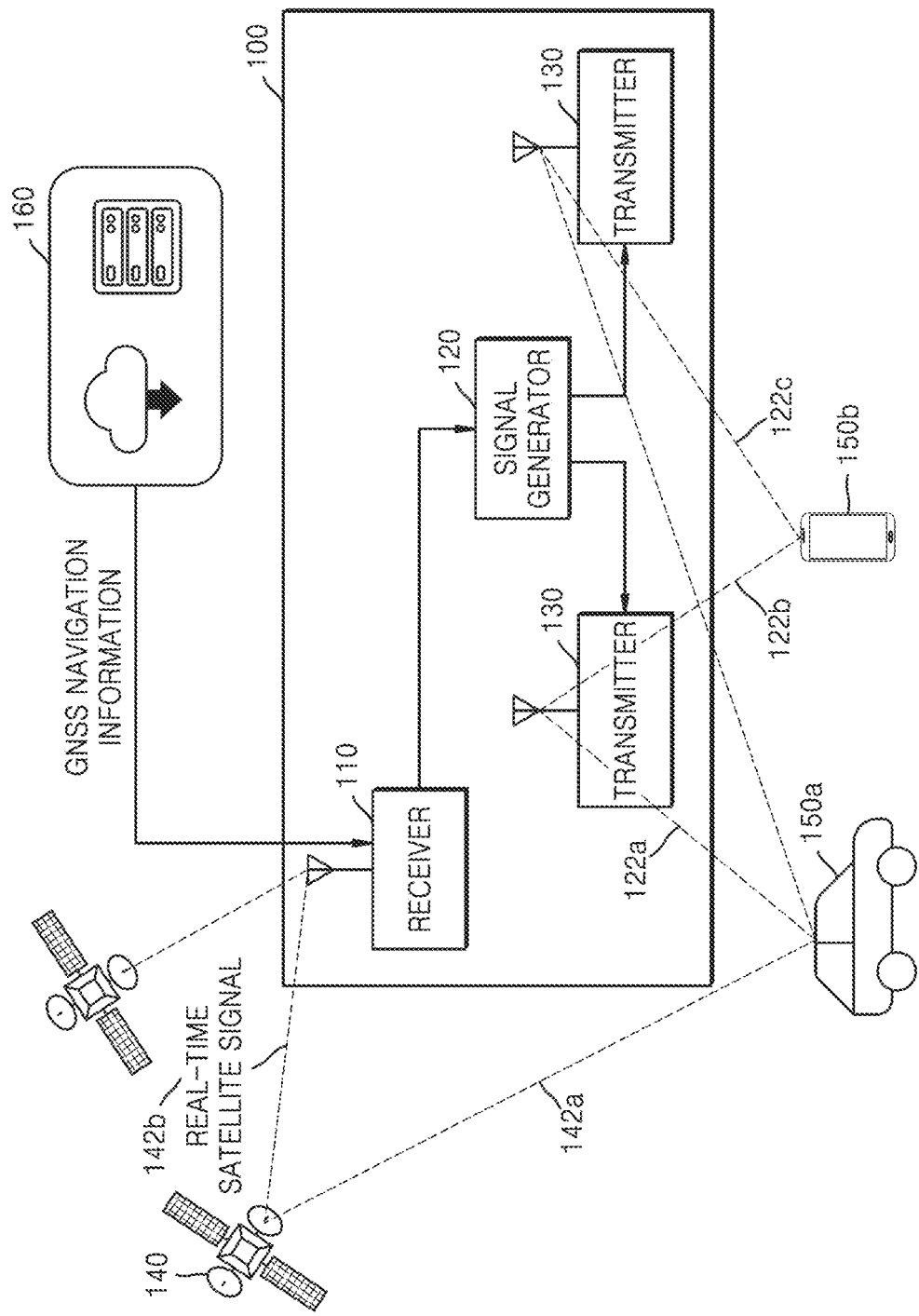
FIG. 1 is a diagram illustrating a global navigation satellite system (GNSS), according to an embodiment of the disclosure.

Because a GNSS uses information received from a satellite, it is difficult to determine a location of a receiver in a GNSS shadow area where there is a problem with line of sight (LOS) communication with the satellite, such as an underground facility. Accordingly, it is difficult to provide accurate location information when location information is to be provided by using a GNSS in an indoor environment. For example, in the case of a system that provides location information in an indoor environment, an underground facility, or a tunnel such as a navigation guidance system in an underground facility or a bus arrival time notification service, the quality of public services useful to citizens is reduced due to limitations of a GNSS. When a bus is located in an underground transfer center and a long tunnel, because GNSS reception is not possible, it is impossible to track a location of the bus and the accuracy of location information and an estimated arrival time of the bus provided by an estimated arrival time service is reduced.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, principles and embodiments of the disclosure will be described in detail in order to fully convey the scope of the disclosure and enable one of ordinary skill in the art to embody and practice the disclosure. The embodiments may be implemented in various forms.

The same reference numerals denote the same elements throughout the specification. All elements of embodiments are not described in the specification, and descriptions of matters well known in the art to which the disclosure pertains or repeated descriptions between embodiments will not be given. Terms such as "part" and "portion" used herein denote those that may be implemented by software or hardware. According to embodiments, a plurality of parts or portions may be implemented by a single unit or element, or a single part or portion may include a plurality of units or elements. Operation principles and embodiments of the disclosure will now be described with reference to the accompanying drawings.

FIG. 1 is a diagram illustrating a global navigation satellite system (GNSS), according to an embodiment of the disclosure.

A GNSS 10 according to embodiments of the disclosure is installed in a GNSS shadow area (e.g., an indoor environment, a tunnel, or an underground facility) where GNSS signals (e.g., 142a and 142b) are not transmitted from a satellite 140, and generates and outputs pseudo GNSS signals 122a, 122b, and 122c. The GNSS 10 may be one of, for example, the United states' global positioning system (GPS), Russia's global navigation satellite system (GLONASS), European Union's Galileo, China's BeiDou, Japan's quasi-zenith satellite system (QZSS), and Indian regional navigation satellite system (IRNSS). Because the actual GNSS signals (e.g., 142a and 142b) are not transmitted to the GNSS shadow area such as an indoor environment, a GNSS signal is not transmitted to a client device 150b in the GNSS shadow area and thus the client device 150b in the GNSS shadow area may not obtain location information through the GNSS 10. In embodiments of the disclosure, however, the GNSS 10 generates the pseudo GNSS signals 122a, 122b, and 122c as if they are generated and output by the satellite 140, and outputs the pseudo GNSS signals 122a, 122b, and 122c to the client device 150b in the GNSS shadow area. Because the pseudo GNSS signals 122a, 122b, and 122c are signals generated in the same manner as signals output from the satellite 140, the client device 150b may obtain location information by processing the pseudo GNSS signals 122a, 122b, and 122c in the same manner as the actual GNSS signal (e.g., 142a) received outside the GNSS shadow area. Accordingly, according to embodiments of the disclosure, location information may be obtained by using the pseudo GNSS signals 122a, 122b, and 122c, by using a general-purpose GNSS module of the client devices 150a and 150b. That is, according to embodiments of the disclosure, the client devices 150a and 150b do not need to change a device structure to process the pseudo GNSS signals 122a, 122b, and 122c of embodiments of the disclosure.

The GNSS 10 includes an apparatus 100 for generating a GNSS signal, the satellite 140, and a server 160. The apparatus 100 receives a real-time satellite signal 142b from the satellite 140, and receives GNSS navigation information from the server 160. Also, the apparatus 100 generates and radiates a pseudo GNSS signal. The client devices 150a and 150b receive a real-time satellite signal 142a from the satellite 140, or receive the pseudo GNSS signals 122a, 122b, and 122c from the apparatus 100. The client devices 150a and 150b receive the real-time satellite signal 142a in an outdoor environment where signal reception from the satellite 140 is possible, and receive the pseudo GNSS signals 122a, 122b, and 122c in a shadow area where satellite signal reception is impossible. As such, because the GNSS 10 according to embodiments of the disclosure provides the pseudo GNSS signals 122a, 122b, and 122c, instead of a satellite signal, without interruption even in the shadow area, the GNSS 10 may provide location information based on the GNSS signals even in the shadow area.

The apparatus 100 includes a receiver 110, a signal generator 120, and a transmitter 130.

The receiver 110 is connected to one or more signal generators 120, and outputs the GNSS navigation information to the one or more signal generators 120. Also, the receiver 110 receives the real-time satellite signal 142b, measures a frequency shift value of the real-time satellite signal 142b, and outputs the frequency shift value to the one or more signal generators 120. The signal generator 120 receives the GNSS navigation information and the frequency shift value from the receiver 110, and generates pseudo GNSS signal information in which the frequency shift value is reflected. The transmitter 130 generates a pseudo GNSS signal from the generated pseudo GNSS signal information, and radiates the pseudo GNSS signal.

According to embodiments of the disclosure, because there is no need for signal conversion between an actual GNSS signal and a pseudo GNSS signal at a receiving end (client device), the receiving end does not take time for GNSS signal conversion during GNSS signal processing. In the case that an external satellite signal is received and radiated in an indoor environment or a GNSS signal in which a frequency shift value is not reflected is radiated in an indoor environment, due to a difference in navigation information and signal characteristics, when moving from an outdoor environment to an indoor environment, the receiving end takes time for conversion between an actual GNSS signal and a GNSS signal radiated in an indoor environment. For example, during conversion between the actual GNSS signal and the GNSS signal radiated in the indoor environment, the receiving end may take 1 minute or more (12 minutes in the worst case) due to the difference in the navigation information and the signal characteristics. According to embodiments of the disclosure, however, because a pseudo GNSS signal in which a frequency shift value is reflected is generated and radiated in an indoor environment, even when signal conversion occurs when the receiving end enters an indoor environment from an outdoor environment, the receiving end may take little time for signal conversion, and may provide a pseudo signal that has continuity with an actual GNSS signal received from the outside.

The one or more signal generators 120 are arranged at certain intervals in the GNSS shadow area. The one or more signal generators 120 may be arranged at certain intervals, by considering a signal coverage of each signal generator 120. For example, when one signal generator 120 covers an area having a diameter of 50 m, the signal generators 120 may be arranged at an interval of 50 m. The receiver 110 may communicate with the server 160 by wire or wirelessly. The receiver 110 may communicate with the signal generator 120 by wire or wirelessly. In the disclosure, reference numeral 120 collectively denotes the one or more signal generators 120.

The receiver 110 receives the GNSS navigation information from the server 160. The GNSS navigation information is information about a location of at least one satellite 140 at a certain point of time in the future. In the server 160, the GNSS navigation information may be updated at an interval of serval seconds, serval minutes, several days, or several weeks. The receiver 110 may receive the GNSS navigation information from the server 160 in a period that is equal to or shorter than an interval at which the GNSS navigation information is updated, to update the stored GNSS navigation information. The receiver 110 receives the GNSS navigation information during a certain future time interval (e.g., 4 weeks) of at least one satellite 140 from the server 160. When the number of the at least one satellite 140 is 13, the receiver 110 receives the GNSS navigation information for each of the 13 satellites 140. According to an embodiment, at least one server 160 that provides the GNSS navigation information corresponding to each of the 13 satellites 140 may exist, and the receiver 110 may receive the GNSS navigation information from each of the at least one server 160. The receiver 110 stores and manages the received GNSS navigation information for each satellite. The receiver 110 may output the GNSS navigation information to the signal generator 120 whenever the GNSS navigation information is updated, or may transmit part of the GNSS navigation information received in a period shorter than a period in which the GNSS navigation information is updated to the signal generator 120 over time.

The GNSS navigation information may be stored and transmitted, for example, as a RINEX file.

According to an embodiment, the server 160 may be a server included in the GNSS 10 according to an embodiment. The server 160 receives and stores the RINEX file during a certain period of time from the satellite 140. Also, the server 160 outputs the RINEX file to the receiver 110. The server 160 may be located around a location of the GNSS 10 (e.g., a tunnel entrance), and may receive the RINEX file from the satellite 140 and may transmit the RINEX file to the receiver 110.

Also, the receiver 110 receives the real-time satellite signal 142b, and calculates a frequency shift value of the real-time satellite signal 142b. The frequency shift value is a value caused by a Doppler shift phenomenon according to a motion of the satellite 140. The frequency shift value may vary according to time, and the receiver 110 calculates the frequency shift value in real time based on the real-time satellite signal 142*b* and outputs the frequency shift value to the signal generator 120. The receiver 110 may calculate the frequency shift value through cross-correlation between the real-time satellite signal 142*b* and a default carrier signal.

Figure 2:
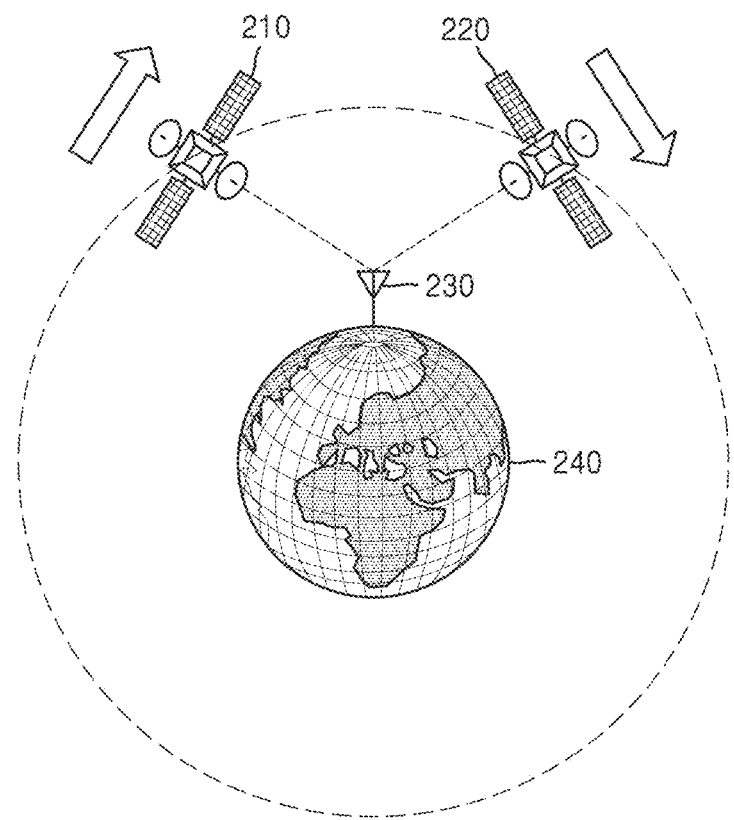
FIG. 2 is a diagram for describing correction of a frequency shift value, according to an embodiment of the disclosure.

FIG. 2 is a diagram for describing correction of a frequency shift value, according to an embodiment of the disclosure.

The GNSS 10 transmits a GNSS signal in a pre-set frequency band. For example, a GPS system radiates a GPS signal in a frequency band of 1575.42 MHz that is a center (nominal) frequency of the GPS system. However, 24 GPS satellites rapidly rotate around the earth 240, and thus a Doppler shift occurs due to the rotation. For example, it is assumed that an antenna 434 installed at a certain location receives a GPS signal. When a GPS signal is received from a GPS satellite 210 moving closer to the antenna 434, the GPS signal detected by the antenna 434 has a Doppler shift in which a frequency increases from the center frequency of 1575.42 MHz of the GPS signal. In contrast, when a GPS signal is received from a GPS satellite 220 moving farther away from the antenna 434, the GPS signal detected by the antenna 434 has a Doppler shift in which a frequency decreases from the center frequency of 1575.42 MHz of the GPS signal. Such a Doppler shift is about +−10 kHz when a client device receiving a GPS signal moves, and is about +−5 kHz when the client device is stationary.

Due to a frequency change caused by a Doppler shift, a client device locks a frequency to a satellite signal to be communicated, tracks a frequency of a corresponding satellite, and maintains communication with the corresponding satellite. In the case of a precise client device, whether a GNSS signal is an actual GNSS signal or a pseudo GNSS signal is distinguished due to a frequency difference. In this case, when the client device receives an actual GNSS signal and then receives a pseudo GNSS signal converted from the actual GNSS signal, due to a frequency difference caused by a Doppler shift, the client device recognizes that the received GNSS signal is not a continuous signal, and thus continuous reception and signal tracking in the client device are interrupted. Even when a time to first fix (TTFF) for a GNSS signal decreases according to such handover, a user of a general client device experiences continuous positioning interruption. For example, when a Doppler effect is not reflected in a pseudo GNSS signal, a client device is locked to a GNSS satellite, and the pseudo GNSS signal has a carrier frequency different from that of an actual GNSS satellite, thereby losing the GNSS signal in a carrier tracking process.

According to embodiments of the disclosure, however, when a pseudo GNSS signal is generated, a Doppler shift at a corresponding location is reflected in the pseudo GNSS signal. Accordingly, when a client device enters or exits an indoor environment or a shadow area where GNSS reception is difficult, continuity of positioning is provided. Also, according to the apparatus 100 of embodiments of the disclosure, because a Doppler shift of a real-time satellite signal is reflected in a pseudo GNSS signal, a client device receives a GNSS signal at continuous frequencies and phases. Accordingly, because the client device is continuously locked to the same satellite (or frequency band of the same satellite) during handover and a TTFF is removed, continuous positioning in indoor and outdoor environments may be performed.

Figure 3:
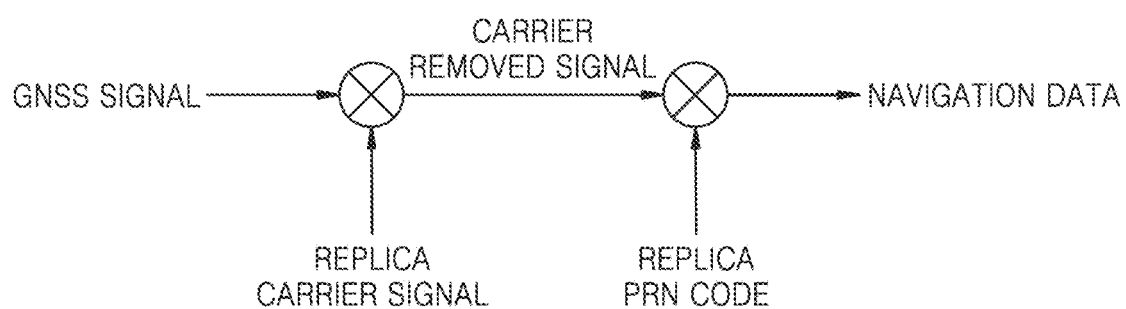
FIG. 3 is a diagram illustrating a configuration in which a client device obtains navigation data from a GNSS signal, according to an embodiment of the disclosure.

FIG. 3 is a diagram illustrating a configuration in which a client device obtains navigation data from a GNSS signal, according to an embodiment of the disclosure.

When a client device receives a GNSS signal, the client device obtains navigation data by removing a carrier wave and a pseudo random number (PRSN) code. The PRN code is a value corresponding to a coarse/acquisition (C/A) code, and is also referred to as a C/A PRN code. To this end, the client device converts the input GNSS signal into a baseband by multiplying the GNSS signal by a replica carrier signal. Also, the client device correlates a replica PRN code with a carrier removed signal from which a carrier signal is removed and removes a PRN code from the carrier removed signal. The PRN code is represented by phase information in the GNSS signal. Due to this process, the client device obtains the navigation data from which the carrier signal and the PRN code are moved.

When a client device receives a GNSS signal, the client device undergoes acquisition and tracking, to obtain a carrier frequency and PRN code phase information. Next, the client device extracts navigation data from the GNSS signal, calculates a pseudorange based on the navigation data, and then measures a location through multilateration.

In order to know a carrier frequency and PRN code phase information, a client device obtains and tracks a carrier frequency and PRN code phase of a GNSS signal while receiving the GNSS signal. The client device obtains navigation data by removing the carrier frequency and the PRN code from the GNSS signal by using the carrier frequency and the PRN code phase obtained by the tracking. When the client device moves from a GNSS signal non-shadow area to a shadow area and handover occurs from an actual GNSS signal to a pseudo GNSS signal, or vice versa, the risk of failing to track a carrier frequency and track a PRN code phase increases. According to embodiments of the disclosure, however, when a pseudo GNSS signal is generated, a frequency shift value of a carrier frequency and a change in a PRN code phase due to a Doppler effect are reflected. Accordingly, during handover of the GNSS signal, the risk that a client device fails to track a frequency and track a PRN code phase significantly decreases.

Figure 4:
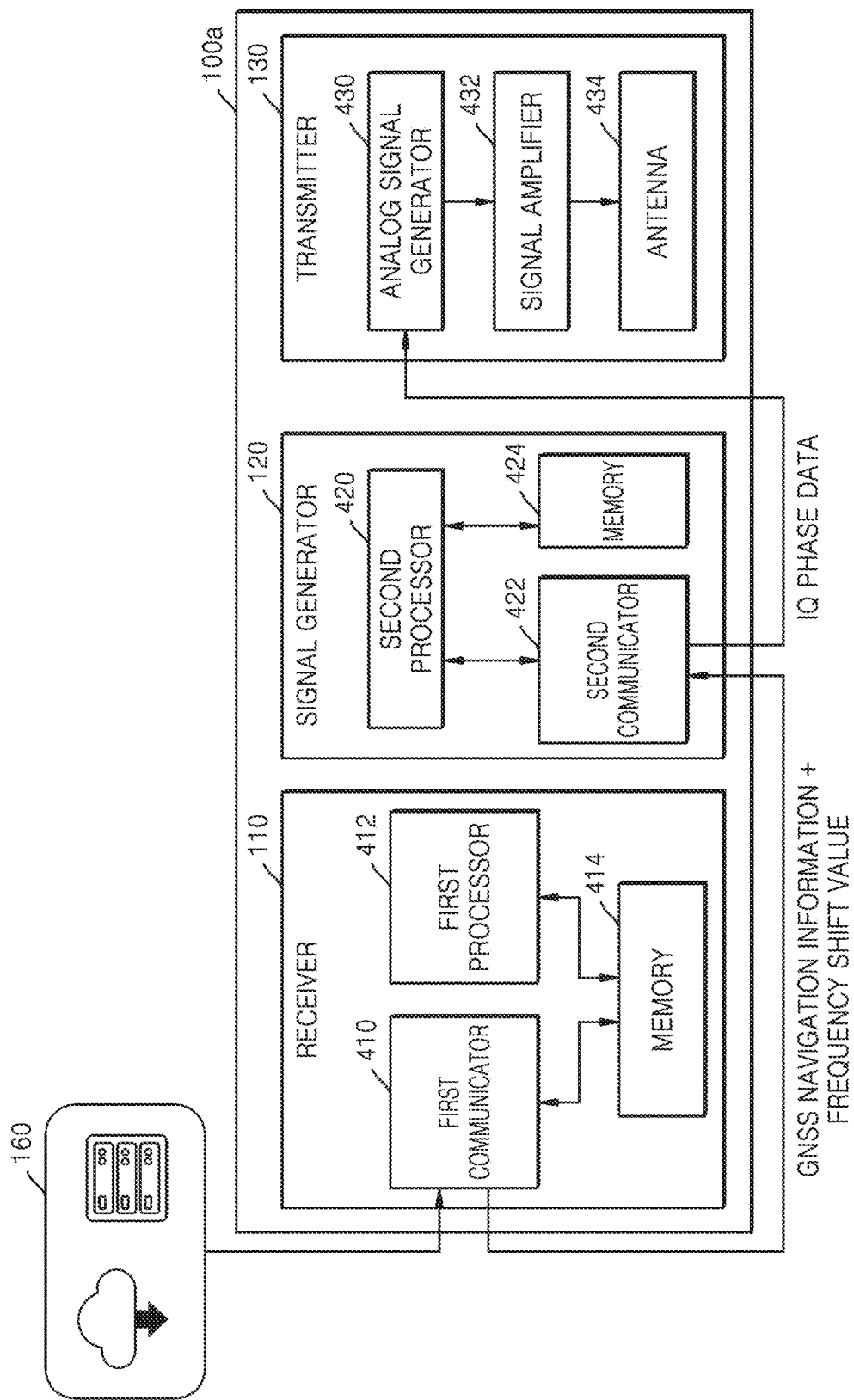
FIG. 4 is a diagram illustrating a structure of an apparatus for generating a GNSS signal, according to an embodiment of the disclosure.

FIG. 4 is a diagram illustrating a structure of an apparatus for generating a GNSS signal, according to an embodiment of the disclosure.

An apparatus 100*a* for generating a GNSS signal according to an embodiment of the disclosure includes the receiver 110, the signal generator 120, and the transmitter 130.

The receiver 110 includes a first communicator 410, a first processor 412, and a memory 414.

The first processor 412 controls an overall operation of the receiver 110. The first processor 412 may be implemented as one or more processors. The first processor 412 may perform a certain operation by executing instructions or commands stored in the memory 414.

The memory 414 may store data and instructions necessary for an operation of the receiver 110. The memory 414 may include at least one of a volatile storage medium and a non-volatile storage medium, or a combination thereof. The memory 414 may be implemented as any of various storage media. The memory 414 may include at least one type of storage medium from among a flash memory type, a hard disk type, a multimedia card micro type, a card type memory (e.g., an SD or XD memory), a random-access memory (RAM), a static random-access memory (SRAM), a read-only memory (ROM), an electrically erasable programmable ROM (EEPROM), a programmable ROM (PROM), a magnetic memory, a magnetic disk, and an optical disk. According to an embodiment, the memory 414 may correspond to a cloud storage space. For example, the memory 414 may be implemented through a cloud service.

The memory 414 stores GNSS navigation information received from the server 160.

The first communicator 410 may communicate with an external device by wire or wirelessly. The first communicator 410 communicates with the server 160 and at least one signal generator 120. Also, the first communicator 410 receives a real-time satellite signal from the satellite 140.

The first communicator 410 may communicate with the server 160, the signal generator 120, and the satellite 140 in different communication methods. The first communicator 410 may perform short-range communication such as Bluetooth, Bluetooth low energy (BLE), near-field communication, WLAN (Wi-Fi), Zigbee, infrared data association (IrDA), Wi-Fi direct (WFD), ultra-wideband (UWB), or Ant+. In another example, the first communicator 410 may use mobile communication, and may transmit/receive a wireless signal to/from at least one of a base station, an external terminal, and a server in a mobile communication network.

The first communicator 410 communicates with at least one satellite 140 in a certain signal band. For example, the first communicator 410 may communicate with at least one satellite 140 in an L1 signal band of 1575.42 MHz. Also, the first communicator 410 may receive real-time satellite signals from a plurality of satellites 140.

The first processor 412 controls the first communicator 410 to receive the GNSS navigation information from the server 160. The first processor 412 requests the server 160 for the GNSS navigation information and receives the GNSS navigation information in every certain period. The first processor 412 may receive the GNSS navigation information from the server 160 in any of variously defined periods, for example, every week or every month. The processor 412 may access a plurality of servers 160 to receive the GNSS navigation information for the plurality of satellites 140 and may receive the GNSS navigation information. For example, the first processor 412 may receive GNSS navigation information for a first satellite from a first server, and may receive GNSS navigation information for a second satellite from a second server. A time and a period of receiving the GNSS navigation information may vary according to a server. For example, the GNSS navigation information for the first satellite may be received every Monday at 9 a.m. at an interval of one week, and the GNSS navigation information for the second satellite may be received every 1 day at 10 a.m. at an interval of 10 days.

The memory 414 stores server information that provides the GNSS navigation information for each satellite, and information about an update period and an update time. The first processor 412 may obtain, from the server 160, the GNSS navigation information, by using the server information that provides the GNSS navigation information for each satellite and the information about the update period and the update time, which are stored in the memory 414. The server information that provides the GNSS navigation information may include, for example, a server name, a server access address, authentication information for accessing the server, a protocol for communicating with the server, and a server operating entity.

The first processor 412 stores and manages the GNSS navigation information received through the first communicator 410 in the memory 414. The first processor 412 may store and manage, in the memory 414, information such as a last update time of the GNSS navigation information stored in the memory 414, information about how long the GNSS navigation information is retained, a source of the GNSS navigation information, and types and the number of satellites that may currently use the GNSS navigation information from the memory 414. Whenever the GNSS navigation information received from the server 160 is updated, the first processor 412 may store and update GNSS navigation information management information in the memory 414.

The first processor 412 transmits the GNSS navigation information stored in the memory 414 to at least one signal generator 120 through the first communicator 410. The first processor 412 sequentially transmits the GNSS navigation information for each satellite stored in the memory 414 to the at least one signal generator 120. The transmission to the at least one signal generator 120 may be performed sequentially or simultaneously. Also, the GNSS navigation information for each of the plurality of satellites may be transmitted as one packet, or may be sequentially transmitted as separate packets.

The first processor 412 may store and manage, in the memory 414, information about the at least one signal generator 120 and information about an access path. Also, the first processor 412 may receive state information of the at least one signal generator 120 from the at least one signal generator 120, and may manage a state of the at least one signal generator 120. The first processor 412 periodically receives the state information of the at least one signal generator 120, or may receive the state information of the at least one signal generator 120 when an event such as an error occurs in the at least one signal generator 120. The state information of the at least one signal generator 120 may include, for example, a power on/off state of the signal generator 120, and an operation mode (e.g., a normal mode, a GNSS navigation update mode, or an abnormal mode).

Also, the first processor 412 calculates a frequency shift value by using a real-time satellite signal received from the satellite 140. The first processor 410 may measure a frequency shift value between a real-time satellite signal and a default carrier signal corresponding to a pre-set default carrier frequency. The default carrier frequency is determined according to a type of a GNSS, and is determined to be 1575.42 MHz in the case of a GPS system. According to an embodiment, the first processor 412 may measure a frequency shift of a real-time satellite signal for a carrier frequency by using software-defined radio (SDR). According to another embodiment, the receiver 110 may include an analog circuit for measuring a frequency shift value, and the first processor 412 may obtain a frequency shift value by using the analog circuit for measuring a frequency shift value. The first processor 412 may transmit the frequency shift value through the first communicator 410 to the at least one signal generator 120 in real time.

According to another embodiment, the first processor 412 calculates a C/A code phase by using a real-time satellite signal received from the satellite 140. A C/A code that corresponds to a PRN code is a value represented by a phase of a satellite signal. The C/A code is a value stored in the GNSS navigation information. The first processor 412 may calculate an actual C/A code phase from a real-time satellite signal, may calculate a phase difference between received GNSS navigation information and the actual C/A code phase, and may generate a C/A phase difference value. The first processor 412 transmits the calculated C/A code phase difference value to the at least one signal generator 120 through the first communicator 410. According to the present embodiment, the receiver 110 may transmit the frequency shift value calculated from the real-time satellite signal and the C/A code phase difference value together to the at least one signal generator 120. In another example, the receiver 110 may transmit the frequency shift value and the C/A code phase value together to the at least one signal generator 120.

Each of the at least one signal generator 120 may have identification information. The receiver 110 may store and manage identification information and location information of the at least one signal generator 120.

The signal generator 120 includes a second processor 420, a second communicator 422, and a memory 424.

The second processor 420 controls an overall operation of the signal generator 120. The second processor 420 may be implemented as one or more processors. The second processor 420 may perform a certain operation by executing instructions or commands stored in the memory 424.

The second communicator 422 may communicate with an external device by wire or wirelessly. The second communicator 422 communicates with the receiver 110. According to an embodiment, the second communicator 422 may communicate with another signal generator 120. The second communicator 422 may perform short-range communication such as Bluetooth, Bluetooth low energy (BLE), near-field communication, WLAN (Wi-Fi), Zigbee, infrared data association (IrDA), Wi-Fi direct (WFD), ultra-wideband (UWB), or Ant+. In another example, the second communicator 422 may use mobile communication, and may transmit/receive a wireless signal to/from at least one of a base station, an external terminal, and a server in a mobile communication network.

The memory 424 may store data and instructions necessary for an operation of the signal generator 120. The memory 424 stores GNSS navigation information received from the receiver 110. The memory 424 may include at least one of a volatile storage medium and a non-volatile storage medium, or a combination thereof. The memory 424 may be implemented as any of various storage media. The memory 424 may include at least one type of storage medium from among a flash memory type, a hard disk type, a multimedia card micro type, a card type memory (e.g., an SD or XD memory), a random-access memory (RAM), a static random-access memory (SRAM), a read-only memory (ROM), an electrically erasable programmable ROM (EEPROM), a programmable ROM (PROM), a magnetic memory, a magnetic disk, and an optical disk.

The signal generator 120 may further include a power supply unit (not shown). The power supply unit supplies power to the second processor 420, the second communicator 422, and the memory 424. According to an embodiment, the power supply unit may include a battery. Also, according to an embodiment, the power supply unit may include a self-power facility such as a solar panel. In another embodiment, the power supply unit may receive power by wire.

The second processor 420 generates IQ phase data of a pseudo GNSS signal corresponding to a location of the signal generator 120, based on the GNSS navigation information. First, the second processor 420 generates information about a GNSS signal that may be received at the location of the signal generator 120, based on an estimated location of a GNSS satellite over time in the GNSS navigation information. The GNSS signal that may be received at the location of the signal generator 120 corresponds to a pseudo GNSS signal. The signal generator 120 generates information about the pseudo GNSS signal, by using a certain software algorithm. The information about the pseudo GNSS signal is generated for each satellite. According to an embodiment, the second processor 420 generates a signal processing channel for each satellite, and generates the information about the pseudo GNSS signal for each satellite in each channel.

The second processor 420 adjusts a frequency of a carrier signal, by using a frequency shift value received from the receiver 110. The receiver 110 defines the carrier signal, by applying the received frequency shift value to a default carrier signal. The second processor generates the information about the pseudo GNSS signal based on the defined carrier signal.

According to an embodiment, the second processor 420 receives a C/A code phase difference value from the receiver 110, defines the pseudo GNSS signal by applying the received C/A code phase difference value, and generates the information about the pseudo GNSS signal.

The second processor 420 generates IQ phase data for each satellite, based on the information about the pseudo GNSS signal over time. The IQ phase data is data including information about an amplitude and a phase of an in-phase carrier wave and a quadrature carrier wave used for quadrature amplitude modulation (QAM). The second processor 420 generates the IQ phase data and outputs the IQ phase data to an analog signal generator 430, and the analog signal generator 430 generates a pseudo GNSS signal for each satellite over time by modulating an analog signal by using the IQ phase data.

The transmitter 130 receives the IQ phase data from the signal generator 120, and generates and radiates a pseudo GNSS signal. The transmitter 130 includes the analog signal generator 430, a signal amplifier 432, and an antenna 434. One or multiple transmitters 130 may be provided for one signal generator 120. Also, one transmitter 130 may include one or more antennas 434.

The analog signal generator 430 generates a pseudo GNSS signal. The analog signal generator 430 generates the pseudo GNSS signal, based on IQ data. The analog signal generator 430 generates a GNSS L1 carrier signal, based on an IQ signal. An L1 frequency of an L1 carrier wave is determined to be 1575.42 MHz for a GPS, 1602.0 to 1615.5 MHz for GLONASS, 1561.1 MHz for BeiDou, 1575.42 MHz for QZSS, and 1176.45 MHz for IRNSS. The analog signal generator 430 may be implemented as any of various types such as an analog circuit for generating and processing an analog signal, or a microcontroller. The analog signal generator 430 may be implemented as, for example, a software-defined radio (SDR) device including an RF transceiver such as a field-programmable gate array (FPGA)-based transceiver (e.g., BladeRF), an ARM core-based transceiver (e.g., HackRF), an Intel core-based transceiver, or an AMD core-based transceiver. The analog signal generator 430 generates the pseudo GNSS signal and outputs the pseudo GNSS signal to the signal amplifier 432.

The signal amplifier 432 amplifies and outputs the pseudo GNSS signal generated by the analog signal generator 430. The signal amplifier 432 amplifies a signal in a GNSS signal frequency band of 1575.42 MHz through a low noise amplifier. Accordingly, the signal amplifier 432 may improve a signal-to-noise ratio (SNR) by amplifying only the pseudo GNSS signal. Also, the signal amplifier 432 may determine an arrival range of a radiated signal by adjusting a gain of signal amplification. The signal amplifier 432 adjusts a gain of signal amplification based on a gain control signal input from the second processor 420. The signal amplifier 432 may include an analog amplification circuit or a microcontroller for signal amplification.

The antenna 434 radiates an amplified signal output from the signal amplifier 432. The antenna 434 may have an operating frequency band including a frequency of 1575.42 MHz that is a GNSS signal frequency band.

Figure 5:
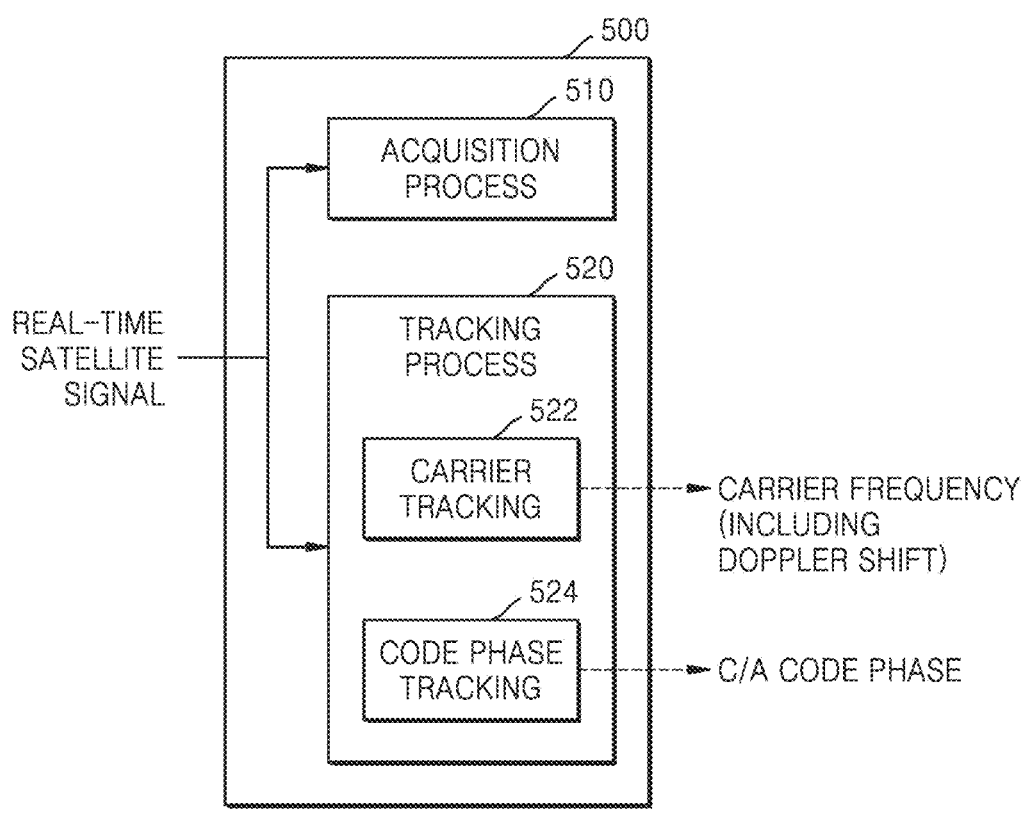
FIG. 5 is a diagram illustrating an operation in which a receiver processes a real-time satellite signal, according to an embodiment of the disclosure.

FIG. 5 is a diagram illustrating an operation in which a receiver processes a real-time satellite signal, according to an embodiment of the disclosure.

According to an embodiment of the disclosure, the receiver 110 receives a real-time satellite signal and performs real-time satellite signal processing 500. The real-time satellite signal processing 500 may be performed by the first processor 412. The first processor 412 performs the real-time satellite signal processing 500, based on computer program instructions stored in the memory 414.

The real-time satellite signal processing 500 includes an acquisition process 510 of detecting a carrier frequency and a C/A code phase from a real-time satellite signal, and a tracking process 520 of tracking the carrier frequency and the C/A code phase. The acquisition process 510 will be described with reference to FIG. 6.

Figure 6:
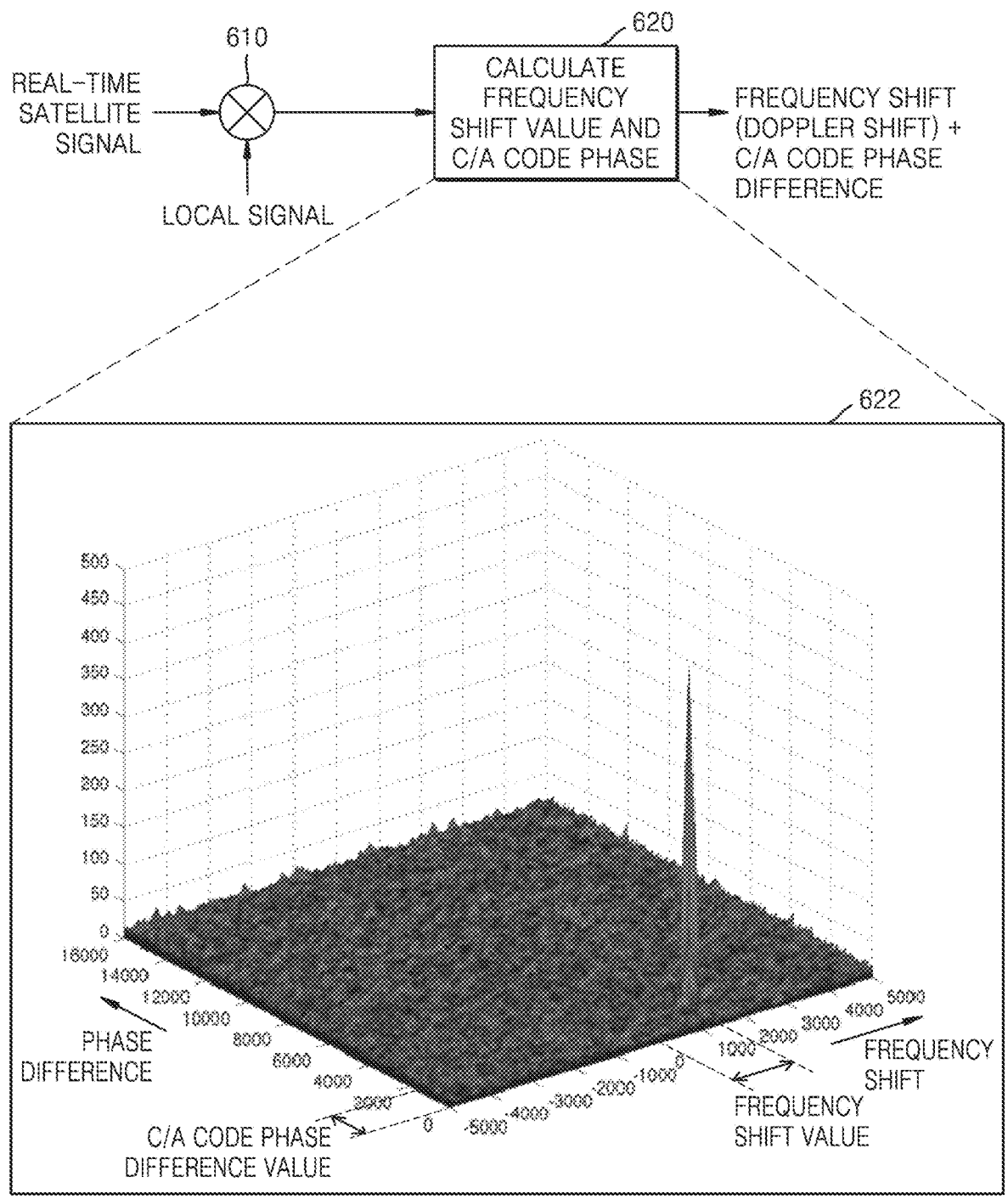
FIG. 6 is a diagram illustrating an acquisition process of a receiver, according to an embodiment of the disclosure.

FIG. 6 is a diagram illustrating an acquisition process of a receiver, according to an embodiment of the disclosure.

In the acquisition process 510, a C/A code phase and a carrier frequency are calculated. A GNSS satellite signal has a unique carrier frequency and a PRN code. The PRN code corresponds to a C/A code. In the acquisition process 510, a carrier frequency and a C/A code phase are obtained through cross-correlation between a received real-time satellite signal and a locally generated local signal.

The acquisition process 510 includes generating the local signal by using GNSS navigation information. The GNSS navigation information includes C/A code phase information, and in the acquisition process 510, a local signal is generated by applying the C/A code phase to a carrier signal of a default carrier frequency.

When the local signal is generated in the acquisition process 510, the real-time satellite signal and the local signal are cross-correlated (610) to obtain a cross-correlation result value 622. In the acquisition process 510, the cross-correlation is performed on a frequency and a phase.

In the acquisition process 510, a frequency shift value and a C/A code phase difference value are calculated from the cross-correlation result value 622 (620). In the acquisition process 510, a peak value 624 is determined in the cross-correlation result value 622, and a frequency shift value and a C/A code phase difference value corresponding to the peak value 624 are determined. In the acquisition process 510, the frequency shift value and the C/A code phase difference value corresponding to the peak value 624 are output.

Next, the tracking process 520 will be described with reference to FIG. 5.

When the frequency shift value and the C/A code phase difference value are calculated in the acquisition process 510, in the tracking process 520, a carrier frequency and a C/A code phase tracked based on the calculated frequency shift value and the calculated C/A code phase difference value. In the tracking process 520, carrier tracking 522 and code phase tracking 524 are performed on the carrier frequency and the C/A code phase that are changed by a motion of a satellite, by using a phase lock loop (PLL) method, a frequency lock loop (FLL) method, or a delay lock loop (DLL) method.

According to an embodiment, the acquisition process 510 may be periodically performed, and in the tracking process 520, the carrier tracking 522 and the code phase tracking 524 may be performed based on a result value of the periodic acquisition process 510. According to another embodiment, the acquisition process 510 may be performed to obtain an initial carrier frequency value and C/A code phase value, and thereafter, the acquisition process 510 may be performed only in a pre-defined case, for example, a case where tracking fails in the tracking process 520 or a case where a new type of satellite signal (e.g., a satellite signal transmitted from another satellite) is detected.

The tracking process 520 includes the carrier tracking 522 and the code phase tracking 524. In the carrier tracking 522, a carrier frequency is tracked, based on the frequency shift value obtained in the acquisition process 510. In the carrier tracking 522, carrier frequency tracking is performed by applying the frequency shift value to a default carrier frequency. Accordingly, a carrier frequency value determined in the frequency tracking 522 is a carrier frequency value in which a Doppler shift is reflected. In the code phase tracking 524, a C/A code phase is tracked, based on the C/A code phase difference value obtained in the acquisition process 510. In the code phase tracking 524, code phase tracking is performed by applying the C/A code phase difference value to a C/A code phase of a local signal. Accordingly, a C/A code phase value determined in the code phase tracking 524 is a value in which a C/A code phase of a real-time satellite signal that varies according to a motion of a satellite is reflected.

Figure 7:
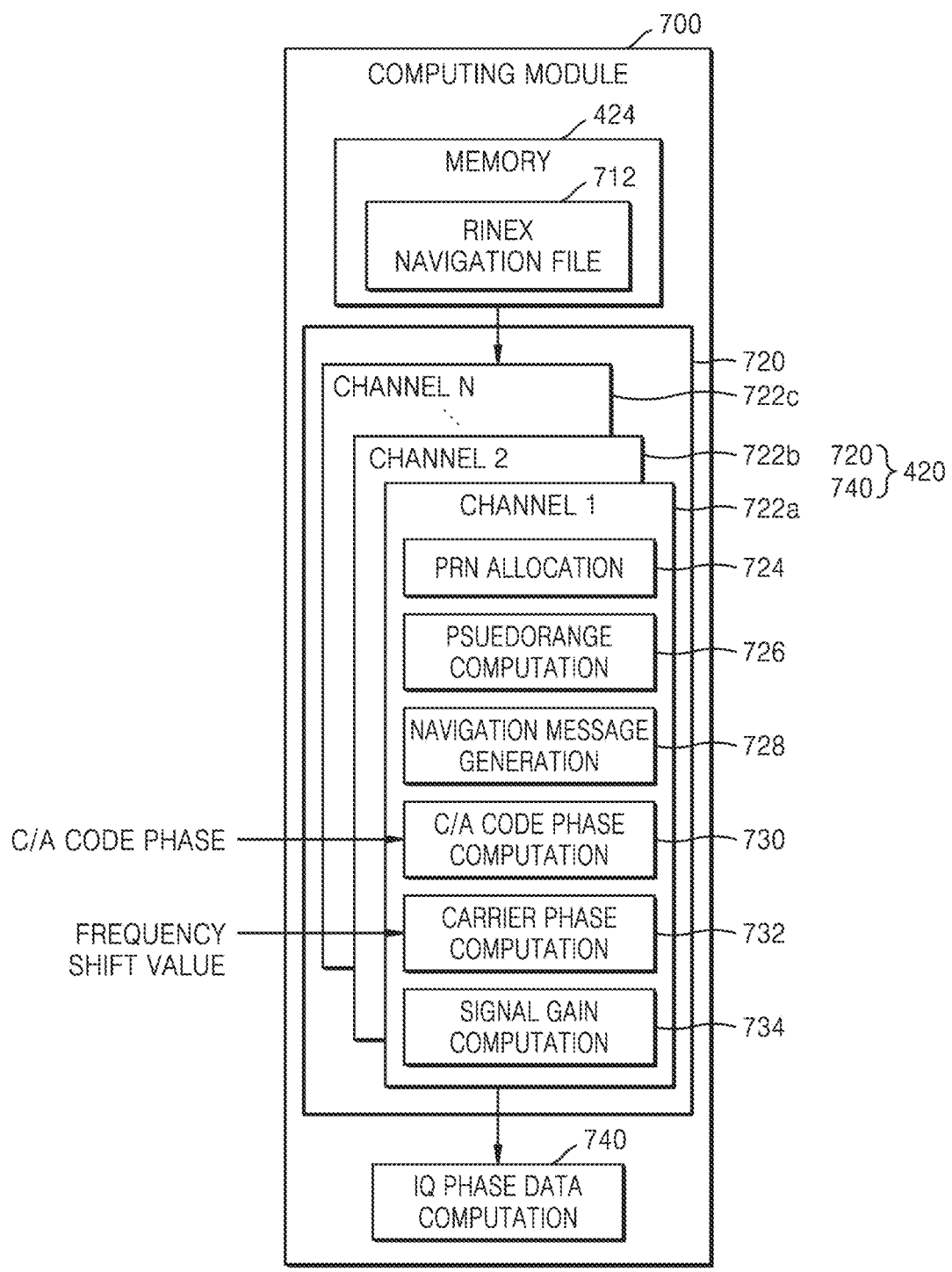
FIG. 7 is a diagram illustrating a structure of a computing module of a signal generator, according to an embodiment of the disclosure.

FIG. 7 is a diagram illustrating a structure of a computing module of a signal generator, according to an embodiment of the disclosure. A computing module 700 of FIG. 7 corresponds to the second processor 420 and the memory 424 of the signal generator 120 of FIG. 4. According to an embodiment, a computing module 700 may be implemented as a flexible printed circuit board (FPCB) and may be mounted on the signal generator 120.

The computing module 700 includes the memory 424 and the second processor 420. The second processor 420 includes a plurality of channels 720 and an IQ phase data generator 740 which generate information about a pseudo GNSS signal for each satellite.

The memory 424 stores a RINEX file corresponding to GNSS navigation information for each satellite. The RINEX file is a data interchangeable format for raw satellite navigation system data. The RINEX file may enable a user to post-process received data to produce a more accurate result. Accordingly, the signal generator 120 that receives the RINEX file may modify information of the RINEX file according to a current location.

The plurality of channels 720 read the GNSS navigation information for each satellite stored in the memory 424, and generate information about a pseudo GNSS signal from the GNSS navigation information based on a location of the signal generator 120. The plurality of channels 720 include a first channel 722a, a second channel 722b, ..., and an $N^{th}$ channel 722c corresponding to respective satellites. Each of the first through $N^{th}$ channels 722a, 722b, ..., and 722c generates the information about the pseudo GNSS signal, by processing the GNSS navigation information corresponding to each satellite.

The GNSS navigation information may include at least one of PRN information of a GNSS signal that may be received by the receiver 110, a code frequency, a carrier frequency, a carrier phase, a code phase, a plurality of subframes, a navigation message according to time, a pseudorange in which ionospheric delay is reflected, a pseudorange rate, an azimuth, and an altitude (AZEL), or a combination thereof. According to an embodiment, the GNSS navigation information includes information such as pseudo-random noise (PRN), a coarse/acquisition (C/A) code (or standard code), a precision (P) code, a carrier phase, or a navigation message.

The ionosphere that is a region formed of ionized and electrically charged particles (e.g., ionized gas) is widely located from about 50 km to more than 1,000 km. Because of the electrical properties of the particles, a propagation velocity in the ionosphere is changed. Such an ionospheric error may increase as a time for which a radio wave passes through the ionosphere increases and ionized particles increase. Also, because a time for which a radio wave passes through the ionsphere increases as a satellite is closer to the horizon, and more ionization of particles occurs during the day when the intensity of sunlight is high, a very large ionospheric error occurs for a satellite close to the horizon during the day. Due to such an error, ionospheric delay occurs in a process of transmitting a satellite signal. The GNSS navigation information may include pseudorange information in which the ionospheric delay is reflected, to measure an accurate distance between the receiver 110 and the satellite 140.

Each of the first through $N^{th}$ channels 722a, 722b, . . . , and 722c includes a PRN allocation block 724, a pseudorange calculation block 726, a navigation message generation block 728, a C/A code phase calculation block 730, a carrier phase calculation block 732, and a signal gain calculation block 734, in order to process the GNSS navigation information. The PRN allocation block 724 allocates a PRN based on a current location of the signal generator 120. The pseudorange calculation block 726 calculates a pseudorange, based on time delay information included in the GNSS navigation information. The navigation message generation block 728 generates a navigation message based on a current time and a location. For example, the navigation message includes a plurality of frames, and each frame includes information about a satellite such as satellite orbit information. The C/A code phase calculation block 730 calculates and outputs a C/A code phase based on a current location and time of the signal generator 120. The C/A code phase is updated according to the pseudorange. The carrier phase calculation block 732 calculates and outputs a carrier phase based on the current location and time of the signal generator 120. The signal gain calculation block 734 calculates and outputs a signal gain based on an output range of a pseudo GNSS signal. For example, when an output range of a GNSS signal is a radius of 50 m, the signal gain calculation block 734 calculates and outputs a signal gain for covering the radius of 50 m. The signal gain is calculated through a path error and AZEL information.

The C/A code phase calculation block 730 determines a C/A code phase by reflecting a C/A code phase value received from the receiver 110. To this end, the C/A code phase calculation block 732 may adjust a C/A code phase value of pseudo GNSS signal information generated from a RINEX file by using the received C/A code phase value.

The carrier phase calculation block 732 determines a carrier frequency and a carrier phase by reflecting a frequency shift value received from the receiver 110. To this end, the carrier phase calculation block 732 may adjust a carrier frequency of the GNSS signal information generated from the RINEX file by using the received frequency shift value.

The IQ phase data generator 740 generates IQ phase data by synthesizing a signal gain value with a C/A code value of each channel, based on the pseudo GNSS signal information. The generated IQ phase data is stored in the memory 424 or a separate buffer. The second processor 420 streams the stored IQ phase data to the transmitter 130 over time.

Information about a pseudo GNSS signal generated by each of the first through $N^{th}$ channels 722a, 722b, . . . , and 722c is output to the IQ phase data generator 740. The IQ phase data generator 740 outputs IQ phase data corresponding to each satellite.

The plurality of channels 720 and the IQ phase data generator 740 may correspond to a software block for executing a certain signal generation algorithm.

Figure 8:
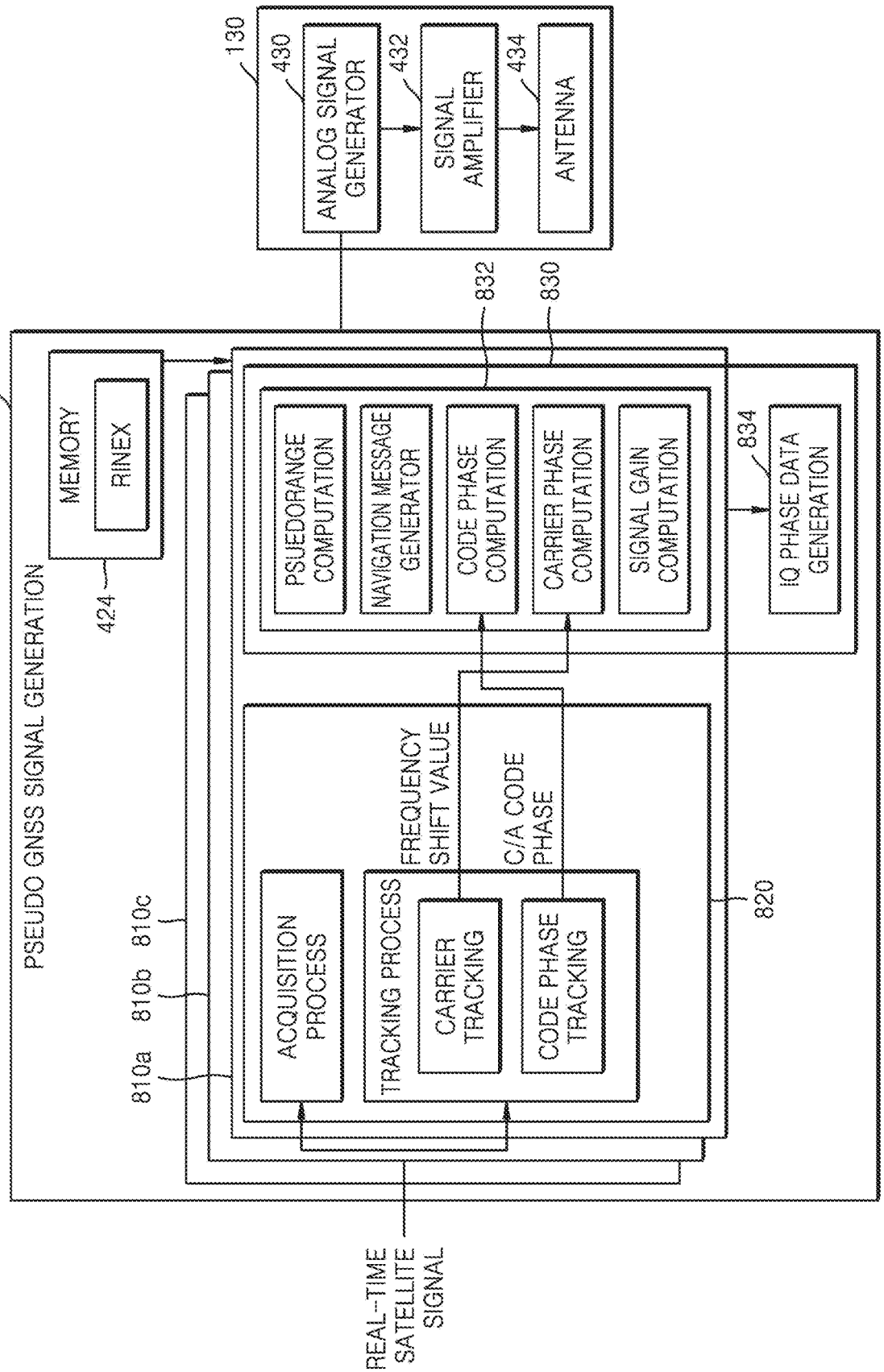
FIG. 8 is a diagram illustrating a process of generating a pseudo GNSS signal, according to an embodiment of the disclosure.

FIG. 8 is a diagram illustrating a process of generating a pseudo GNSS signal, according to an embodiment of the disclosure.

According to an embodiment of the disclosure, the apparatus 100 may receive satellite signals from a plurality of satellites, and may generate pseudo GNSS signals corresponding to the plurality of satellites. The apparatus 100 performs real-time satellite signal processing and pseudo GNSS signal generation on each of the plurality of satellites through signal processing channels 810a, 810b, and 810c respectively corresponding to the plurality of satellites. Signal processings of the signal processing channels 810a, 810b, and 810c may be performed in parallel.

Pseudo GNSS signal generation 800 includes real-time satellite signal processing 820 and IQ signal generation 830. Each of the signal processing channels 810a, 810b, and 810c performs the real-time satellite signal processing 820 and the IQ signal generation 830 on a satellite corresponding to the corresponding channel. The real-time satellite signal processing 820 corresponds to real-time satellite signal processing 810 performed by the receiver 110, and the IQ signal generation 830 is performed by the computing module 700 of the signal generator 120. The IQ signal generation 830 includes pseudo GNSS signal information generation 832 and IQ phase data generation 834 as described above. In the pseudo GNSS signal information generation, information about a pseudo GNSS signal is generated from GNSS navigation data stored in a RINEX file and is output. In the IQ phase data generation 834, IQ phase data is generated from the information about the pseudo GNSS signal.

According to an embodiment, the real-time satellite signal processing 820 and the pseudo GNSS signal information generation 832 may be performed in parallel for each of the channels 810a, 810b, and 810c for each satellite, and the IQ signal generation 830 may be performed in series for each satellite. Also, the IQ phase data generated by the IQ signal generation 830 is output to the transmitter 130, and the transmitter 130 generates and radiates a pseudo GNSS signal from the IQ phase data.

According to an embodiment, the transmitter 130 may sequentially generate and transmit pseudo GNSS signals for the satellites. For example, the transmitter 130 may time-divide a signal frame, and may generate and radiate a pseudo GNSS signal for each satellite in each time division zone.

According to another embodiment, the transmitter 130 includes a plurality of signal generation channels, and may generate and radiate in parallel pseudo GNSS signals for a plurality of satellites. When pseudo GNSS signals for a plurality of satellites are generated and radiated in parallel, the transmitter 130 may include the analog signal generator 430, the signal amplifier 432, and the antenna 434 corresponding to each channel.

According to an embodiment, when the transmitter 130 includes a plurality of signal generation channels, the transmitter 130 may include three signal generation channels, and may generate and radiate pseudo GNSS signals corresponding to three satellites from IQ phase data for the three satellites. In this case, the pseudo GNSS signal generation 800 may also include three signal processing channels 810a, 810b, and 810c, and may generate IQ phase data for three satellites and may output the IQ phase data to the transmitter 130.

Figure 9:
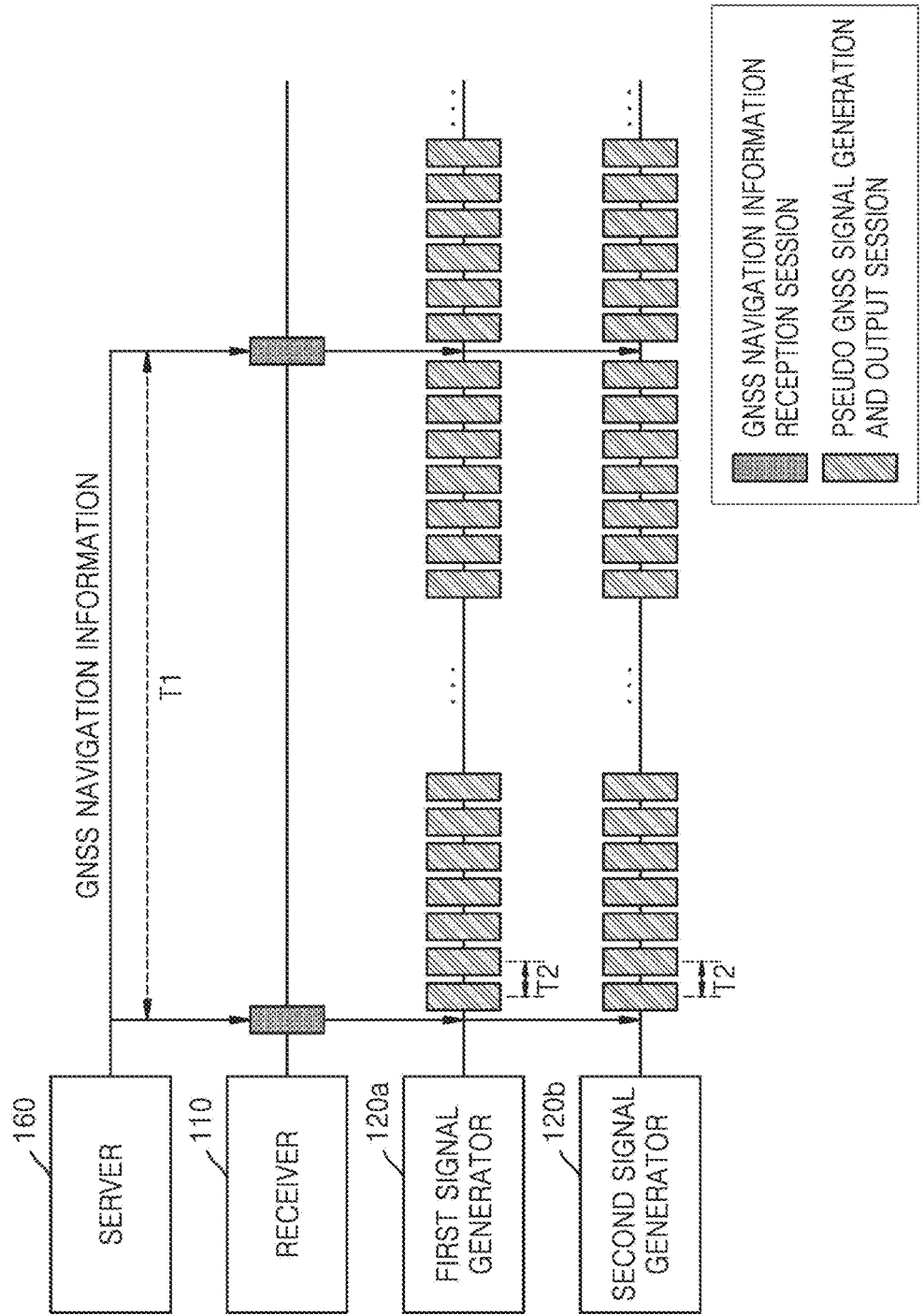
FIG. 9 is a diagram illustrating a communication operation between a receiver and at least one signal generator, according to an embodiment of the disclosure.

FIG. 9 is a diagram illustrating a communication operation between a receiver and at least one signal generator, according to an embodiment of the disclosure. Although two signal generators are illustrated in FIG. 9, the number of signal generators may be determined in various ways according to embodiments.

According to an embodiment of the disclosure, the receiver 110 receives GNSS navigation information from the server 160 in a first period T1. The receiver 110 communicates with the server 160 in a GNSS navigation information reception session to receive the GNSS navigation information.

The receiver 110 transmits the received GNSS navigation information to a first signal generator 120a and a second signal generator 120b. According to an embodiment, the receiver 110 transmits the GNSS navigation information to the first signal generator 120a and the second signal generator 120b in THE first period T1.

The first signal generator 120a and the second signal generator 120b generate and output pseudo GNSS signal information in a pseudo GNSS signal generation and output session. The first signal generator 120a and the second signal generator 120b generate and output the pseudo GNSS signal information in a second period T2. The second period T2 is a time less than 1 second, and the first signal generator 120a and the second signal generator 120b generate and output a pseudo GNSS signal in real time. The second period T2 is a time interval shorter than the first period T1. For example, the second period T2 may be 1/60 seconds, and the first period T1 may be a week.

The receiver 110 may receive a real-time satellite signal, separate from the GNSS navigation information, may calculate a frequency shift value and a C/A code phase difference value, and may transmit the frequency shift value and the C/A code phase difference value to the first signal generator 120a and the second signal generator 120b. A period in which the receiver 110 generates and transmits the frequency shift value and the C/A code phase difference value is shorter than the first period T1. Also, a period in which the receiver 110 generates and transmits the frequency shift value and the C/A code phase difference value may be equal to or shorter than the second period T2.

Figure 10:
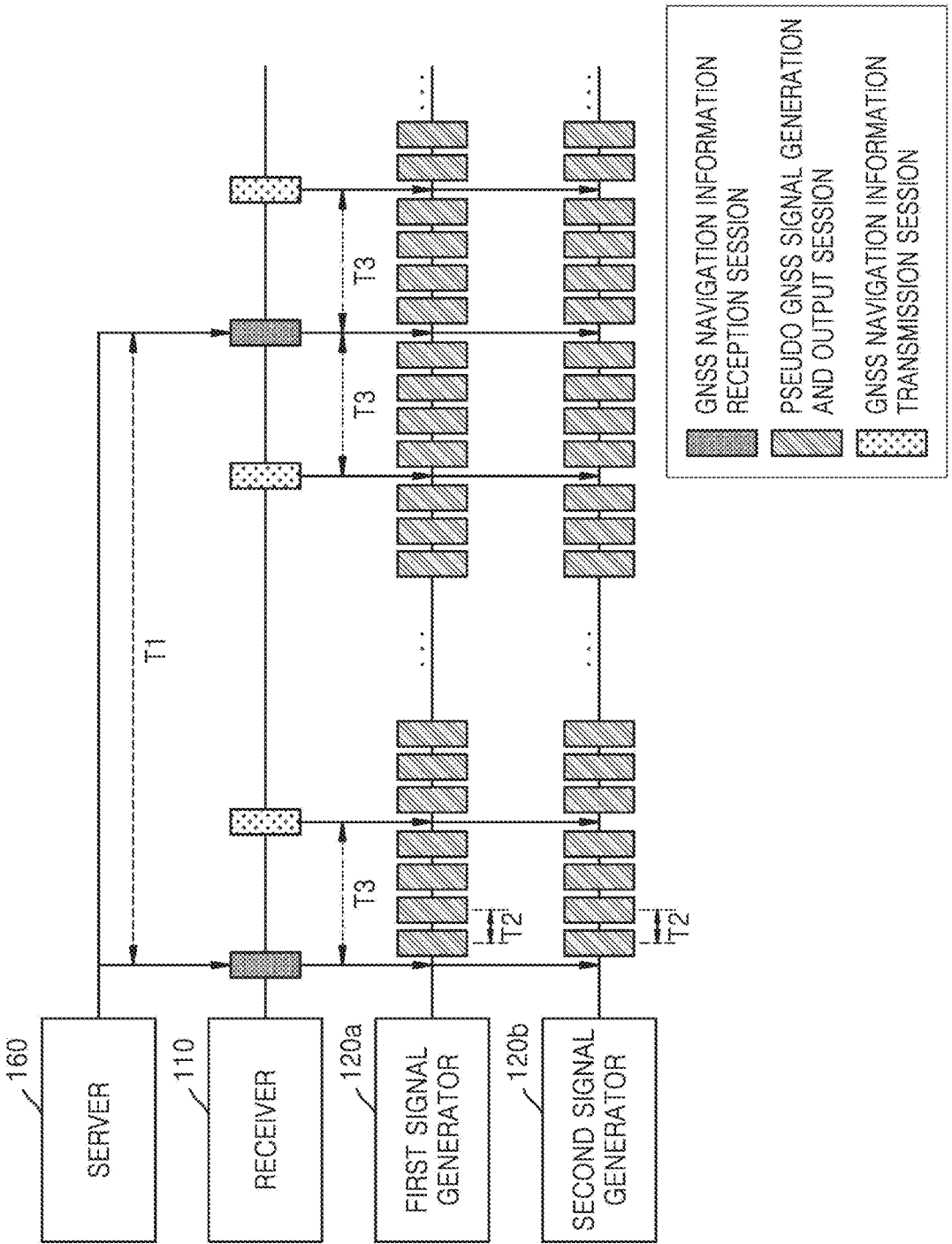
FIG. 10 is a diagram illustrating a communication operation between a receiver and at least one signal generator, according to an embodiment of the disclosure.

FIG. 10 is a diagram illustrating a communication operation between a receiver and at least one signal generator, according to an embodiment of the disclosure. Although two signal generators are illustrated in FIG. 10, the number of signal generators may be determined in various ways according to embodiments.

Referring to FIG. 10, the receiver 110 receives GNSS navigation information from the server 160 in the first period T1, and transmits the GNSS navigation information to the first signal generator 120a and the second signal generator 120b in a third period T3. The third period T3 is a time shorter than the first period T1 and longer than the second period T2. The receiver 110 stores the received GNSS navigation information in a memory 214, and transmits the GNSS navigation information corresponding to a next time interval to the first signal generator 120a and the second signal generator 120b in the third period T3. Because the receiver 110 transmits the GNSS navigation information to the first signal generator 120a and the second signal generator 120b at a time interval divided from and shorter than the first period T1, a storage space required by the first signal generator 120a and the second signal generator 120b may be reduced and manufacturing costs of the first signal generator 120a and the second signal generator 120b may be reduced.

The receiver 110 transmits the GNSS navigation information to the first signal generator 120a and the second signal generator 120b in a GNSS navigation information reception session and a GNSS navigation information transmission session. The third period T3 may be set to a time longer than the second period T2, such as a day or several hours.

The receiver 110 receives a real-time satellite signal, separate from the GNSS navigation information, calculates a frequency shift value and a C/A code phase difference value, and transmits the frequency shift value and the C/A code phase difference value to the first signal generator 120a and the second signal generator 120b. A period in which the receiver 110 generates and transmits the frequency shift value and the C/A code phase difference value is shorter than the first period T1. Also, a period in which the receiver 110 generates and transmits the frequency shift value and the C/A code phase difference value may be equal to or shorter than the second period T2.

Figure 11:
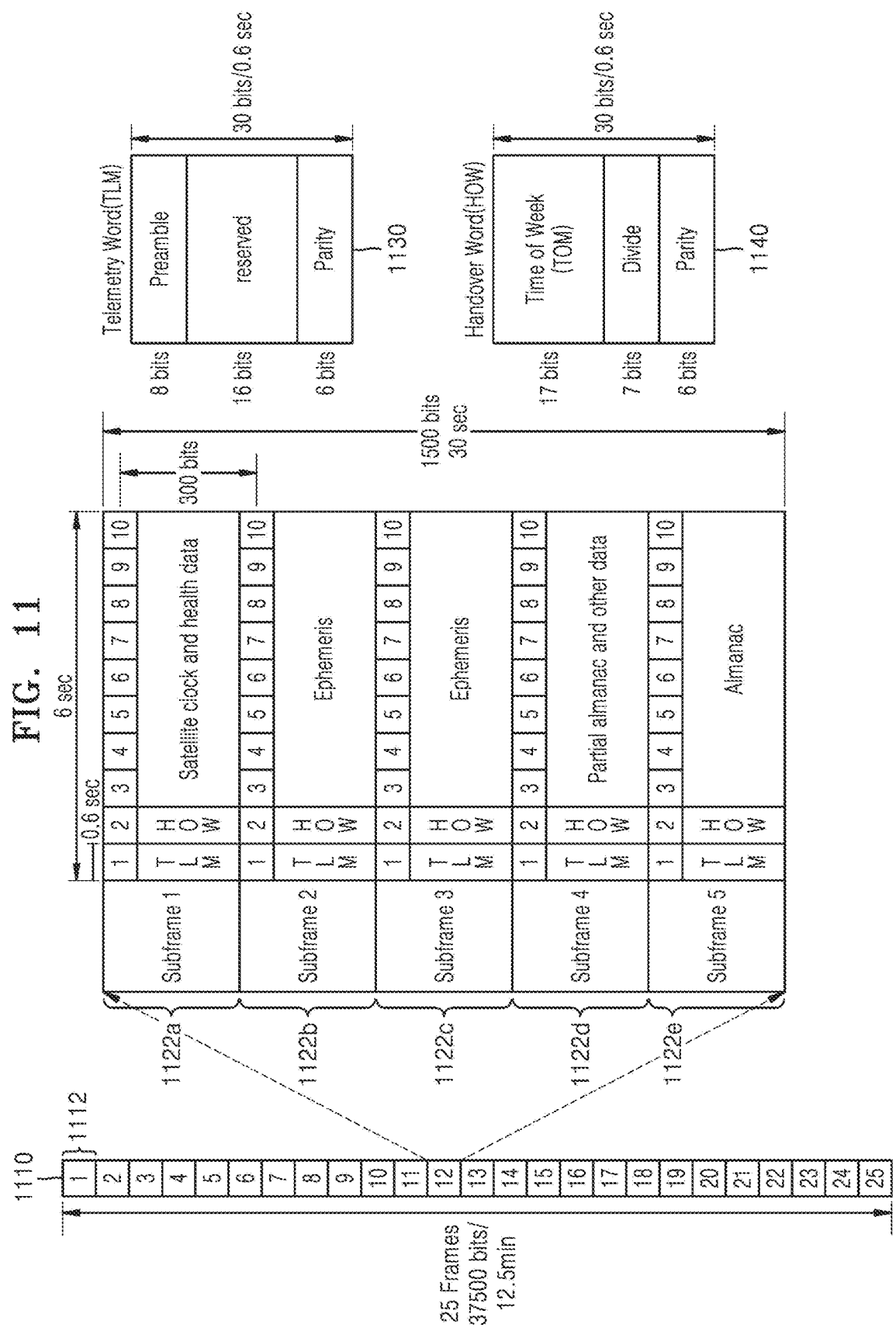
FIG. 11 is a diagram illustrating a structure of a coarse/acquisition (C/A) code signal, according to an embodiment of the disclosure.

FIG. 11 is a diagram illustrating a structure of a C/A code signal, according to an embodiment of the disclosure.

All satellites radiate L1 C/A signals. An L1 signal uses a frequency of 1575.42 MHz. A C/A signal includes a plurality of frames 1110. Each frame 1112 of the plurality of frames 1110 corresponds to one satellite. Each frame 1112 includes a plurality of subframes, e.g., first through fifth subframes 1122a, 1122b, 1122c, 1122d, and 1122e. The first through fifth subframes 1122a, 1122b, 1122c, 1122d, and 1122e store certain allocated information. For example, the first subframe 1122a includes a satellite clock and health data, the second subframe 1122b and the third subframe 1122c include satellite orbit information and ephemeris, the fourth subframe 1122d includes some of satellite orbit information and state information (almanac) and other data, and the fifth subframe 5 1122c includes satellite orbit information and state information (almanac). Also, each of the first through fifth subframes 1122a, 1122b, 1122c, 1122d, and 1122e includes a telemetry word (TLM) 1130 and a handover word (HOW) 1140. The TLM 1130 that is a remote measurement signal enables a receiver to search for a start point of each subframe and determine a start time of a navigation subframe as a receiver time. The HOW 1140 may be used to give a GNSS time (actually a time when a first bit of a next subframe will be transmitted) and identify a specific subframe within a complete frame.

Figure 12:
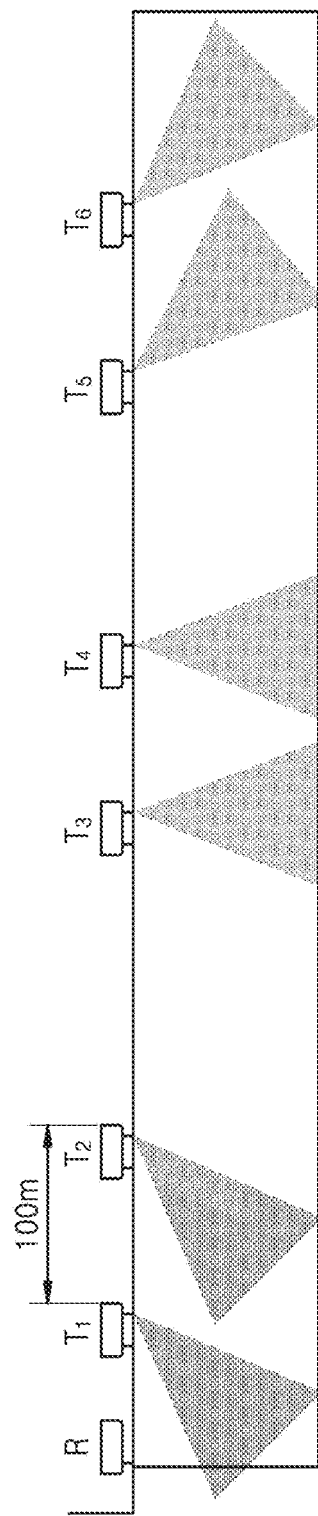
FIG. 12 is a diagram illustrating an arrangement of transmitters, according to an embodiment of the disclosure.

FIG. 12 is a diagram illustrating an arrangement of transmitters, according to an embodiment of the disclosure.

According to an embodiment of the disclosure, a receiver R, a signal generator, and transmitters $T_1$, $T_2$, $T_3$, $T_4$, $T_5$, and $T_6$ are arranged in an indoor space. The transmitters $T_1$, $T_2$, $T_3$, $T_4$, $T_5$, and $T_6$ are arranged at a certain interval determined based on a coverage of the transmitters $T_1$, $T_2$, $T_3$, $T_4$, $T_5$, and $T_6$. For example, the transmitters $T_1$, $T_2$, $T_3$, $T_4$, $T_5$, and $T_6$ may have a coverage of a diameter of 100 m, and may be arranged at an interval of 100 m.

The transmitters $T_1$, $T_2$, $T_3$, $T_4$, $T_5$, and $T_6$ may be arranged to each have an optimized antenna radiation angle. A radiation angle of each of the transmitters $T_1$, $T_2$, $T_3$, $T_4$, $T_5$, and $T_6$ is set to receive a GNSS signal having an intensity equal to or greater than a certain intensity at all positions in the indoor space. Also, a radiation angle of each of the transmitters $T_1$, $T_2$, $T_3$, $T_4$, $T_5$, and $T_6$ is determined so that a GNSS signal shadow area is not generated in the indoor space.

According to an embodiment of the disclosure, an antenna of each of the transmitters $T_1$, $T_2$, $T_3$, $T_4$, $T_5$, and $T_6$ includes a directional antenna. According to an embodiment, the precision of determining a location of a client device may be improved, by adjusting an angle of a directional antenna of each of the transmitters $T_1$, $T_2$, $T_3$, $T_4$, $T_5$, and $T_6$. Because the client device may receive a pseudo GNSS signal radiated from the directional antenna, may measure a distance between the client device and the transmitters $T_1$, $T_2$, $T_3$, $T_4$, $T_5$, and $T_6$, the accuracy of detecting a location of the client device may be further improved. For example, when the transmitters $T_1$, $T_2$, $T_3$, $T_4$, $T_5$, and $T_6$ are installed in a tunnel, the client device may calculate a distance from the received pseudo GNSS signal to the transmitters $T_1$, $T_2$, $T_3$, $T_4$, $T_5$, and $T_6$, by adjusting a signal output angle of the directional antenna in a range of 30° to 60°. In contrast, in the case of a non-directional antenna, it is difficult for the client device to measure a distance between the transmitters $T_1$, $T_2$, $T_3$, $T_4$, $T_5$, and $T_6$ and the client device.

The client device may calculate a distance to a satellite by using time delay information calculated by using RINEX information and an arrival time from the antenna. The arrival time from the antenna indicates an arrival time from the transmitters $T_1$, $T_2$, $T_3$, $T_4$, $T_5$, and $T_6$ to the client device. According to an embodiment of the disclosure, because a directional antenna is installed at an angle, it is possible for the client device to calculate an arrival time from the antenna. Because the arrival time from the antenna is used along with time delay information calculated by using RINEX information, the client device may obtain more accurate location information.

Figure 13:
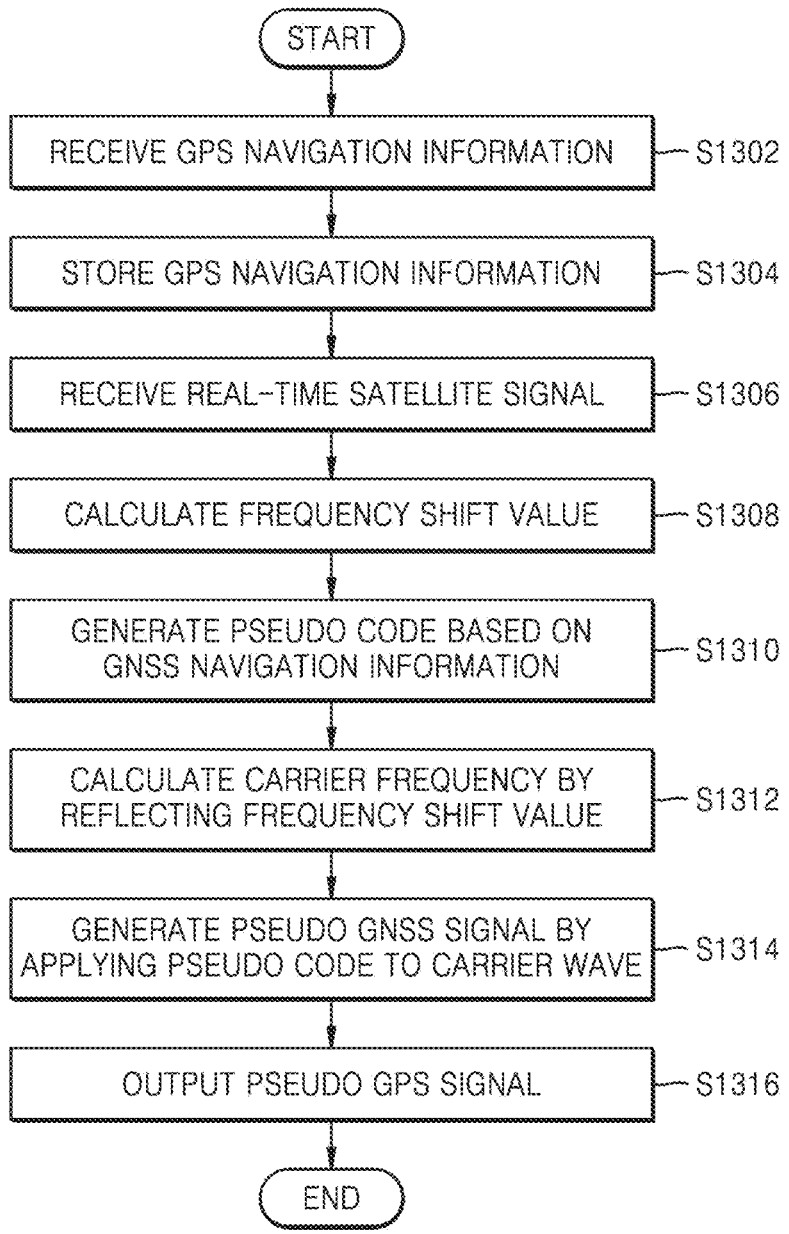
FIG. 13 is a flowchart, according to an embodiment of the disclosure.

FIG. 13 is a flowchart, according to an embodiment of the disclosure.

A method of generating a GNSS signal according to an embodiment of the disclosure may be performed by various GNSSs. An example in which the apparatus 100 of FIGS. 1 through 12 performs a method of generating a GNSS signal will be mainly described. Accordingly, embodiments described for the apparatus 100 may be applied to embodiments for the method of generating a GNSS signal, and embodiments described for the method of generating a GNSS signal may be applied to embodiments for the apparatus 100. The method of generating a GNSS signal according to disclosed embodiments is not limited to the embodiment in which the apparatus 100 performs the method of generating a GNSS signal, and may be performed by various types of GNSSs.

An apparatus for generating a GNSS signal receives GNSS navigation information from a satellite (S1302). The apparatus for generating a GNSS signal receives the GNSS navigation information from a server that provides the GNSS navigation information for each satellite in a certain period.

The apparatus for generating a GNSS signal stores the received GNSS navigation information in a memory (S1304). The apparatus for generating a GNSS signal generates a pseudo GNSS signal, by using the stored GNSS navigation information (S1306). The apparatus for generating a GNSS signal generates information about the pseudo GNSS signal at each point of time of each satellite from the GNSS navigation information, and generates IQ phase data based on the information about the pseudo GNSS signal. The apparatus for generating a GNSS signal generates a pseudo GNSS signal by using the IQ phase data.

Also, the apparatus for generating a GNSS signal receives a real-time satellite signal (S1306). The apparatus for generating a GNSS signal installs a receiver in an outdoor environment where a satellite signal is receivable and receives a real-time satellite signal. The apparatus for generating a GNSS signal may receive real-time satellite signals from a plurality of satellites.

The apparatus for generating a GNSS signal calculates and obtains a frequency shift value from the real-time satellite signal (S1308). Also, according to an embodiment, the apparatus for generating a GNSS signal calculates and obtains a C/A code phase value along with the frequency shift value from the real-time satellite signal. The apparatus for generating a GNSS signal may generate a local signal by using the received GNSS navigation information, and may calculate the frequency shift value and the C/A code phase value by cross-correlating the local signal with the real-time satellite signal.

Next, the apparatus for generating a GNSS signal generates pseudo GNSS signal information from the stored GNSS navigation data, by reflecting the calculated frequency shift value and the calculated C/A code phase value (S1310). The apparatus for generating a GNSS signal determines a carrier frequency of the pseudo GNSS signal by reflecting the frequency shift value, and determines a C/A code phase value of the pseudo GNSS signal information by reflecting the C/A code phase value. The pseudo GNSS signal information may be converted into IQ phase data and may be output. The apparatus for generating a GNSS signal may generate the pseudo GNSS signal information for each of the plurality of satellites.

Next, the apparatus for generating a GNSS signal generates a pseudo GNSS signal, based on the pseudo GNSS signal information (S1312). The apparatus for generating a GNSS signal may generate the pseudo GNSS signal by using SDR, or may generate the pseudo GNSS signal by using a separate analog signal generation circuit. The apparatus for generating a GNSS signal may generate the pseudo GNSS signal from the IQ phase data.

Next, the apparatus for generating a GNSS signal outputs the pseudo GNSS signal (S1314). The apparatus for generating a GNSS signal radiates the pseudo GNSS signal through an antenna. The apparatus for generating a GNSS signal may amplify and radiate the pseudo GNSS signal. In this case, the apparatus for generating a GNSS signal may adjust an arrival range of a signal by adjusting an amplification factor of the pseudo GNSS signal.

Figure 14:
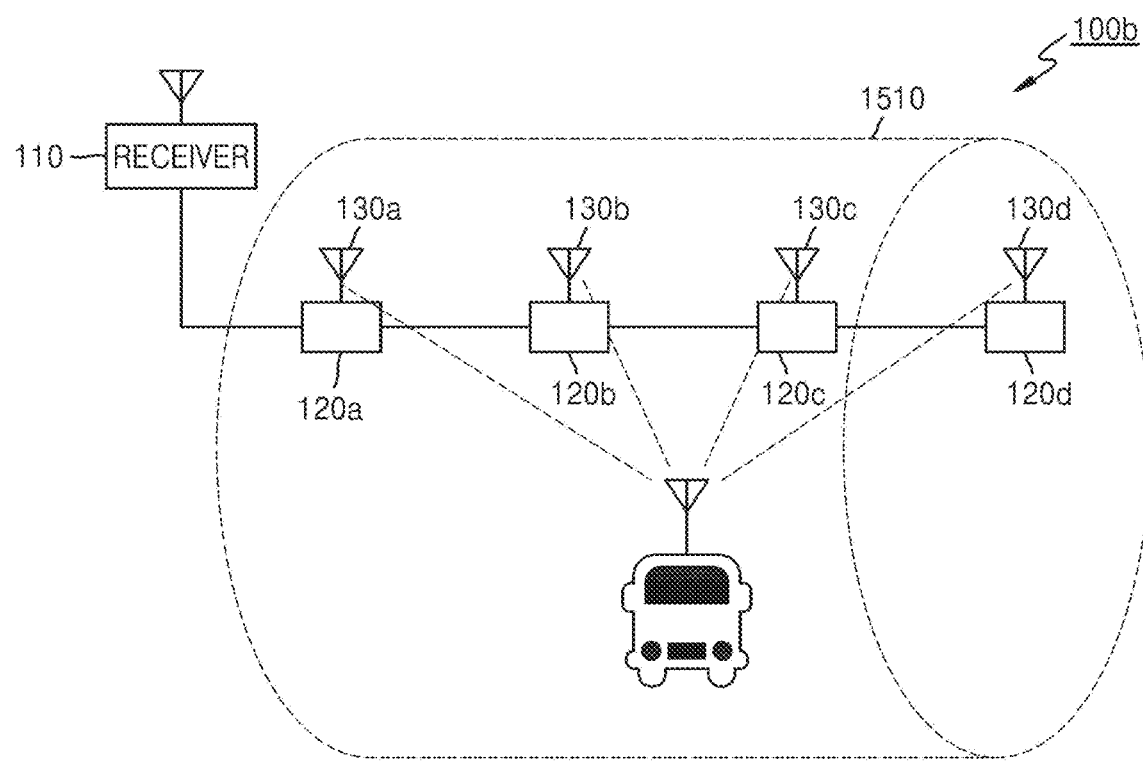
FIG. 14 is a diagram illustrating an apparatus for generating a GNSS signal, according to an embodiment of the disclosure.

FIG. 14 is a diagram illustrating an apparatus for generating a GNSS signal, according to an embodiment of the disclosure.

According to an embodiment of the disclosure, an apparatus 100b for generating a GNSS signal locates the receiver 110 in an outdoor environment where a signal may be received from the satellite 140. The receiver 110 receives a satellite signal from the satellite 140, and maintains a hot state of a GNSS by considering a TTFF. The TTFF is an actual time taken to determine a location in the signal generators 120a, 120b, 120c, and 120d. The TTFF is determined by an operating state of the signal generators 120a, 120b, 120c, and 120d, a time since last location correction, a last corrected location, and a design of the specific signal generators 120a, 120b, 120c, and 120d. The TTFF may be calculated by an apparatus for receiving a GNSS signal such as the signal generators 120a, 120b, 120c, and 120d or a client device. The operating state may include a plurality of states. For example, the operating state may include a hot state, a warm state, and a cold state. The hot state is a state where the apparatus for receiving a GNSS signal has data such as satellite information and almanac, and thus the apparatus for receiving a GNSS signal may be rapidly locked to satellites included in the information. The warm state is a state where the apparatus for receiving a GNSS signal has satellite information, almanac, UTC, etc., but the apparatus for receiving a GNSS signal may not receive a signal from a satellite included in the information. The cold state is a state where the apparatus for receiving a GNSS signal is not used for three days or more, or the apparatus for receiving a GNSS signal receives a GNSS signal again at a location more than a certain distance from a location where a GNSS signal is last received. In the cold state, it may take up to 12 minutes to receive a GNSS signal again and determine a location.

The receiver 110 predicts the satellite 140 that is likely to be 3D fixed based on TTFF information, and reflects corresponding information in the signal generators 120a, 120b, 120c, and 120d. The satellite 140 that is likely to be 3D fixed is a satellite capable of most rapidly receiving a GNSS signal based on a TTFF, and a satellite that is in a hot state from among satellites capable of receiving a signal has a high priority. The plurality of signal generators 120a, 120b, 120c, and 120d update a satellite list, by using predicted information of the satellite 140 that is likely to be 3D fixed. The plurality of signal generators 120a, 120b, 120c, and 120d write information about the satellite 140 that is likely to be 3D fixed to the satellite list, select the satellite 140 whose 3D fixing probability is equal to or higher than a certain reference value, and generate and output a pseudo GNSS signal with respect to the selected satellite 140. The plurality of signal generators 120a, 120b, 120c, and 120d output the generated pseudo GNSS signal through antennas 130a, 130b, 130c, and 130d to a client device 150.

According to an embodiment of the disclosure, each of the signal generators 120a, 120b, 120c, and 120d in the apparatus 100b output pseudo GNSS signals of a plurality of different satellites 140. That is, the first signal generator 120a outputs pseudo GNSS signals of a plurality of different satellites 140, and the second signal generator 120b outputs pseudo GNSS signals of a plurality of different satellites 140. The pseudo GNSS signals of the plurality of different satellites 140 have different satellite identification information. Each of the signal generators 120a, 120b, 120c, and 120d stores a satellite list, and the stored satellite list is updated by the receiver 110 as described above. The pseudo GNSS signals are output through the antennas 130a, 130b, 130c, and 130d provided in the signal generators 120a, 120b, 120c, and 120d.

According to an embodiment of the disclosure, a pseudo GNSS signal is generated by using a signal band and a protocol of an existing GNSS such as GPS or GLONASS. The plurality of signal generators 120a, 120b, 120c, and 120d generate a pseudo GNSS signal by using an L1 frequency and a protocol of an existing GNSS. Accordingly, according to embodiments of the disclosure, there is no need to separately create a base station for a pseudo satellite, and there is no need to differently set a protocol or a frequency band in order to prevent collision with a GNSS signal of an existing GNSS.

Embodiments may be implemented on computer-readable recording media storing instructions and data executable by computers. The instructions may be stored as program codes, and when being executed by a processor, may cause a certain program module to be generated and a certain operation to be performed. Also, when executed by the processor, the instructions may cause certain operations of the disclosed embodiments to be performed.

According to embodiments of the disclosure, there are provided an apparatus and method of providing a GNSS signal in a space (e.g., an indoor environment or an underground facility) where a GNSS signal may not be received because line of sight communication with an artificial satellite is impossible due to an obstacle such as a roof.

Also, according to embodiments of the disclosure, there are provided an apparatus and method of providing a GNSS signal in an indoor environment by using a general-purpose GNSS module, without changing a configuration of a receiving end of a client device.

Also, according to embodiments of the disclosure, there are provided an apparatus and method in which because a Doppler shift of an actual satellite signal is reflected when a pseudo GNSS signal is provided, during conversion from an actual GNSS signal to a pseudo GNSS signal or from a pseudo GNSS signal to an actual GNSS signal, a client device may receive a GNSS signal without interruption.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for generating a global navigation satellite system (GNSS) signal, the apparatus comprising:
   a receiver configured to receive GNSS navigation information for a plurality of GNSS satellites, store the GNSS navigation information, receive a real-time satellite signal, and calculate a frequency shift value of the real-time satellite signal with respect to a default carrier frequency based on the real-time satellite signal;
   at least one signal generator configured to receive the GNSS navigation information from the receiver, and generate pseudo GNSS signal information corresponding to a current time and a current location based on the GNSS navigation information and the frequency shift value; and
   a transmitter configured to generate a pseudo GNSS signal based on the pseudo GNSS signal information, and amplify and output the pseudo GNSS signal,
   wherein the GNSS navigation information is information indicating an estimated location of a GNSS satellite over time,
   wherein the receiver is further configured to generate a local signal by applying a coarse/acquisition (C/A) code phase value of the GNSS navigation information to a carrier signal of a default carrier frequency, wherein the carrier signal of the default carrier frequency is configured to be generated by the apparatus, and calculate the frequency shift value and a coarse/acquisition (C/A) code phase difference value, by cross-correlating the real-time satellite signal with the local signal,
   wherein the at least one signal generator is further configured to track a carrier frequency in which a Doppler shift is reflected and the C/A code phase value, based on the calculated frequency shift value and the calculated C/A code phase difference value, and generate the pseudo GNSS signal information by applying the tracked carrier frequency and the tracked C/A code phase value to the GNSS navigation information, and wherein the receiver is configured to:
receive the GNSS navigation information in a first period, and
transmit the GNSS navigation information to the at least one signal generator in a third period,
wherein the at least one signal generator is configured to generate and output the pseudo GNSS signal information in a second period, and
wherein the second period is shorter than the first period, and the third period is shorter than the first period and longer than the second period.

2. The apparatus of claim 1, wherein
the signal generator is further configured to generate IQ phase data generated by reflecting the pseudo GNSS signal information in a carrier wave corresponding to a frequency calculated by reflecting the frequency shift value, and output the IQ phase data to the transmitter, and
the transmitter is further configured to modulate and radiate a carrier signal of a GNSS L1 frequency band by using the IQ phase data.

3. The apparatus of claim 2, wherein the transmitter comprises a signal amplifier for amplifying an output signal generated by reflecting the IQ phase data, the transmitter being further configured to adjust an arrival range of the output signal by adjusting an amplification factor of the signal amplifier.

4. The apparatus of claim 1, wherein the receiver is further configured to receive the GNSS navigation information in a first period from a server that provides information about a future estimated location of the GNSS satellite during a certain period of time.

5. The apparatus of claim 1, wherein the receiver comprises:
a first communicator configured to communicate with at least one server and the at least one GNSS signal generator;
a memory; and
a first processor configured to receive the GNSS navigation information for each of a plurality of GNSS satellites from the at least one server through the first communicator, store the received GNSS navigation information in the memory, and transmit the GNSS navigation information stored in the memory to the at least one signal generator through the first communicator.

6. The apparatus of claim 1, wherein the at least one signal generator comprises:
a second communicator configured to communicate with the receiver and the transmitter;
a memory configured to store the GNSS navigation information; and
a second processor configured to generate the pseudo GNSS signal information based on the frequency shift value and the GNSS navigation information, and output the pseudo GNSS signal information to the transmitter through the second communicator.

7. The apparatus of claim 1, wherein the transmitter comprises:
an analog signal generator configured to generate an analog signal corresponding to the pseudo GNSS signal, by modulating a carrier signal of a frequency band of a GNSS by using IQ phase data corresponding to the pseudo GNSS signal information;
a signal amplifier configured to amplify the analog signal generated by the at least one signal generator; and
an antenna configured to output the amplified analog signal.

8. The apparatus of claim 1, wherein the GNSS navigation information comprises at least one of pseudo-random noise (PRN) information of a GNSS signal receivable by the receiver, a code frequency, a carrier frequency, a carrier phase, a code phase, a plurality of subframes, a navigation message according to time, a pseudorange in which ionospheric delay is reflected, a pseudorange rate, an azimuth, and an altitude, or a combination thereof.

9. The apparatus of claim 1, wherein the GNSS navigation information is receiver independent exchange format (RINEX) information.

10. The apparatus of claim 1, wherein the receiver is configured to generate and transmit the frequency shift value and the C/A code phase difference value in a fourth period, and wherein the fourth period is shorter than the first period.

11. The apparatus of claim 10, wherein the fourth period is equal to or shorter than the second period.

12. A method of generating a global navigation satellite system (GNSS) signal in an apparatus, the method comprising:
receiving GNSS navigation information for a plurality of GNSS satellites by a receiver in a first period;
storing the GNSS navigation information in the receiver;
receiving a real-time satellite signal by the receiver;
calculating a frequency shift value of the real-time satellite signal with respect to a default carrier frequency based on the real-time satellite signal by the receiver;
transmitting the GNSS navigation information from the receiver to at least one signal generator in a third period;
generating and outputting pseudo GNSS signal information corresponding to a current time and a current location based on the GNSS navigation information in a second period by the at least one signal generator, wherein the second period is shorter than the first period, and the third period is shorter than the first period and longer than the second period;
generating a pseudo GNSS signal based on the pseudo GNSS signal information; and
amplifying and outputting the pseudo GNSS signal,
wherein the GNSS navigation information is information indicating an estimated location of a GNSS satellite over time,
wherein the calculating comprises:
generating a local signal by applying a coarse/acquisition (C/A) code phase value of the GNSS navigation information to a carrier signal of a default carrier frequency,
wherein the carrier signal of the default carrier frequency is generated by the apparatus, calculating the frequency shift value and a coarse/acquisition (C/A) code phase difference value, by cross-correlating the real-time satellite signal with the local signal,
wherein the generating pseudo GNSS signal information comprises:
tracking a carrier frequency in which a Doppler shift is reflected and the C/A code phase value, based on the calculated frequency shift value and the calculated C/A code phase difference value; and
generating the pseudo GNSS signal information by applying the tracked carrier frequency and the tracked C/A code phase value to the GNSS navigation information.

* * * * *

UNITED STATES PATENT AND TRADEMARK OFFICE
CERTIFICATE OF CORRECTION

PATENT NO. : 12,092,747 B2
APPLICATION NO. : 17/450213
DATED : September 17, 2024
INVENTOR(S) : Jihoon Ryoo Page 1 of 1

It is certified that error appears in the above-identified patent and that said Letters Patent is hereby corrected as shown below:

In the Claims

Column 23, Line 15, Claim 2, delete "wherein" and insert -- wherein: --.

Column 23, Lines 39 and 40, Claim 5, delete "GNSS signal generator" and insert -- signal generator --.

Signed and Sealed this
Twenty-first Day of January, 2025

Coke Morgan Stewart
*Acting Director of the United States Patent and Trademark Office*